(12) United States Patent
Chaleff

(10) Patent No.: US 12,437,887 B2
(45) Date of Patent: Oct. 7, 2025

(54) CONTROL DRUM CONTROLLER FOR NUCLEAR REACTOR SYSTEM

(71) Applicant: Standard Nuclear, Inc., New York, NY (US)

(72) Inventor: Ethan Chaleff, Groveland, CA (US)

(73) Assignee: Standard Nuclear, Inc., New York, NY (US)

( * ) Notice: Subject to any disclaimer, the term of this patent is extended or adjusted under 35 U.S.C. 154(b) by 392 days.

(21) Appl. No.: 18/010,358

(22) PCT Filed: Aug. 17, 2021

(86) PCT No.: PCT/US2021/046201
§ 371 (c)(1),
(2) Date: Dec. 14, 2022

(87) PCT Pub. No.: WO2022/040116
PCT Pub. Date: Feb. 24, 2022

(65) Prior Publication Data
US 2023/0230714 A1    Jul. 20, 2023

Related U.S. Application Data

(60) Provisional application No. 63/066,414, filed on Aug. 17, 2020.

(51) Int. Cl.
*G21C 7/14*       (2006.01)
*G21C 7/28*       (2006.01)
(Continued)

(52) U.S. Cl.
CPC ............. *G21C 7/14* (2013.01); *G21C 7/28* (2013.01); *G21C 9/027* (2013.01); *B64G 1/408* (2013.01); *B64G 1/422* (2013.01); *G21D 5/02* (2013.01)

(58) Field of Classification Search
CPC ........ B64D 27/22; B64G 1/408; B64G 1/422; G21C 7/08; G21C 7/12; G21C 7/14; G21C 7/28; G21C 9/027; G21D 5/02
(Continued)

(56) References Cited

U.S. PATENT DOCUMENTS 3,296,083 A    1/1967  Haake et al.
3,778,344 A   12/1973  Walsh
(Continued)

FOREIGN PATENT DOCUMENTS

WO    2021067902 A1    4/2021
WO    2021067903 A1    4/2021

OTHER PUBLICATIONS

International Search Report and Written Opinion for International Application No. PCT/US21/46201, dated Feb. 14, 2022, 8 pages.

*Primary Examiner* — Jinney Kil
(74) *Attorney, Agent, or Firm* — Buchanan Ingersoll & Rooney PC

(57) ABSTRACT

A nuclear reactor system includes a nuclear reactor core disposed in a pressure vessel. Nuclear reactor system further includes control drums disposed longitudinally within the pressure vessel and laterally surrounding fuel elements and at least one moderator element of the nuclear reactor core to control reactivity. Each of the control drums includes a reflector material and an absorber material. Nuclear reactor system further includes a control drum controller with a counterweight to impart a reverse torque on the control drum. Control drum controller includes a driven pulley coupled to the counterweight, a tension member coupled to the driven pulley to rotatably control the driven pulley and apply torque to the driven pulley, and an actuator to apply a tension force to the tension member. The actuator counteracts the reverse torque with the applied tension force, and (Continued)

the tension member applies the torque in response to the tension force.

26 Claims, 12 Drawing Sheets

(51) Int. Cl.
    *G21C 9/027*      (2006.01)
    *B64G 1/40*      (2006.01)
    *B64G 1/42*      (2006.01)
    *G21D 5/02*      (2006.01)

(58) Field of Classification Search
    USPC .................................. 376/220, 223, 318, 909
    See application file for complete search history.

(56) References Cited

U.S. PATENT DOCUMENTS

| | | |
|---|---|---|
| 3,793,832 A | 2/1974 | Moon |
| 9,299,464 B2 | 3/2016 | Venneri et al. |
| 9,620,248 B2 | 4/2017 | Venneri |
| 10,032,528 B2 | 7/2018 | Venneri |
| 10,109,378 B2 | 10/2018 | Snead |
| 10,475,543 B2 | 11/2019 | Venneri |
| 10,573,416 B2 | 2/2020 | Venneri |
| 10,643,754 B2 | 5/2020 | Venneri et al. |
| 2019/0172594 A1 | 6/2019 | Lyons et al. |
| 2020/0027587 A1 | 1/2020 | Venneri |
| 2021/0005335 A1 | 1/2021 | Snead |
| 2022/0328202 A1* | 10/2022 | Venneri ................... G21C 9/02 |

* cited by examiner

CONTROL DRUM CONTROLLER FOR NUCLEAR REACTOR SYSTEM

CROSS-REFERENCE TO RELATED APPLICATIONS

This application is a U.S. National Phase Application of International Application No. PCT/US2021/046201, filed Aug. 17, 2021, the entirety of which is incorporated by reference herein. International Application No. PCT/US2021/046201 claims priority to U.S. Provisional Patent Application No. 63/066,414, filed on Aug. 17, 2020, titled "Control Drum Drive Mechanism," the entirety of which is incorporated by reference herein.

This application relates to International Application No. PCT/US2020/054189, filed on Oct. 4, 2020, titled "Automatic Shutdown Controller for Nuclear Reactor System with Control Drums," which published as International Publication No. WO 2021/067902 on Apr. 8, 2021, the entirety of which is incorporated by reference herein.

TECHNICAL FIELD

The present subject matter relates to examples of nuclear systems and nuclear reactors for power production and propulsion, e.g., in remote regions, such as outer space. The present subject matter also encompasses a nuclear reactor system that includes a control drum controller having volume-efficient control drum actuators that rotate control drums to increase or decrease neutron flux from outside a pressure vessel of a nuclear reactor. The control drum controller improves safety and design of control drum actuators while reducing mass, by using a novel torque transmission system coupled with torsion springs to provide a high-level of control while enabling a robust snap-close feature during loss of power or mechanical failures. The control drum controller has application to nuclear thermal propulsion (NTP) and nuclear reactors that employ control drums in general.

BACKGROUND

Nuclear fission reactors include thermal or fast type reactors. Currently, almost all operating nuclear fission reactors are thermal. Nuclear fission reactors include nuclear fuel inside a nuclear reactor core and a moderator to slow down fast neutrons so that nuclear fission can continue. Typically, the nuclear fuel is formed in cylindrical shaped fuel compacts or pellets. The fuel compacts are loaded into fuel pins or rods, cladded, and stacked inside the numerous columns of fuel elements in the nuclear reactor core.

A nuclear reactor burns nuclear fuel at extremely high temperatures, facilitated by a reflector. The reflector redirects free neutrons back toward the nuclear reactor core, increasing the number of fissile reactions, energy production, and nuclear reactor core operating temperature. Some nuclear reactor architectures also include control drums located near the reflector to selectively regulate the neutron population and nuclear reactor power level during operation. By selectively regulating the neutron population, the control drums also directly impact the nuclear reactor core operating temperature.

Operating temperatures that exceed the design constraints of the nuclear reactor can result in the nuclear reactor core overheating, which presents a problem scenario known as a core meltdown. A core meltdown involves the nuclear reactor core becoming superheated and melting through containment layers, directly harming the nuclear reactor and the surrounding space. Core meltdowns can be avoided by safely lowering the nuclear reactor core temperature to a temperature low enough to avoid melting of containment layers. Generally, nuclear reactor cores operating at lower temperatures are more tolerant of unexpected errors; however, higher temperature nuclear reactors obtain superior performance.

In a nuclear reactor for conventional terrestrial land applications, e.g., a nuclear power plant, the nuclear reactor is typically built in a location that is isolated away from human life. In the conventional terrestrial land application, the size and mass of the nuclear reactor is not a major concern: generally, the goal is to build as large and efficient of a nuclear power plant as possible, to provide the maximum amount of electrical power. The nuclear power plant is actively staffed by human operators (e.g., skilled engineers, scientists, and technicians), as the nuclear reactor needs to be actively monitored and maintained to provide optimal electrical output and ensure safety. If a problem arises with the nuclear reactor, the human operators are alerted and can remediate the problem, such as a misalignment of control drums that may cause core meltdown.

In nuclear reactor systems for nuclear thermal propulsion (NTP), the size and mass of the nuclear reactor directly impact performance. A reduced size and mass of the NTP nuclear reactor system is needed for technical feasibility and commercial viability. Hence, in an NTP nuclear reactor system, the nuclear reactor is located within or in very close proximity to a vehicle coupled to the nuclear reactor. If the vehicle coupled to the NTP nuclear reactor is occupied by a human, isolation of the nuclear reactor from human life is infeasible. For example, the NTP nuclear reactor may need to be located closely to crew quarters of a spacecraft vehicle.

In nuclear reactor systems for providing nuclear power (e.g., thermal and/or electrical power) in remote region applications including outer space, celestial bodies, planetary bodies, and remotes regions on Earth, space is at a premium. In particular, space within the pressure vessel of the nuclear reactor, can be very costly—every square inch of the interior of the pressurized vessel requires some combination of neutron moderators and reflectors. Therefore, migrating any system or component that facilitates the nuclear reactor from within the pressure vessel to outside the pressure vessel, reduces the overall volume, and consequently the interior surface area, of the pressure vessel. Components within the pressure vessel that do not directly generate or interact with free neutrons can make for good candidates to migrate to the exterior of the pressure vessel.

Additionally, as components are moved to the exterior of the pressure vessel, their required maintenance is also moved outside of the pressure vessel. Due to a reduction in functional internal components, the interior of the pressure vessel will likely need to be accessed less often for maintenance by skilled technicians. Advanced designs can even move the formerly interior components far away from the nuclear reactor, allowing for safe maintenance with minimal concern for irradiating personnel. Such designs thereby improve maintenance efficiency and safety, as well as reduce the interior surface area of the relatively expensive pressure vessel. Accordingly, designs to migrate as many nuclear reactor components from within the pressure vessel to outside the pressure vessel are needed.

SUMMARY

An improved technique for actuating the control drums 115A-N in a nuclear reactor system 100 is described, which is an improvement over legacy systems. Generally, the various examples disclosed herein relate to nuclear technologies for nuclear reactor systems both for space or terrestrial land applications. To improve safety and reliability of the nuclear reactor system 100, a control drum controller 215 allows for increasing or decreasing neutron flux, or neutron fluence during a particular period of time, within nuclear reactor 107 via control drums 115A-N. Because the control drum controller 215 is located outside the pressure vessel 160 of the nuclear reactor system 100, the pressure vessel 160 can be smaller, and the control drum controller 215 can be more easily maintained. The control drum controller 215 works by using a wire-pulley system, which allows routing the actuator to a more favorable position as compared to the co-axial orientation of the legacy mechanism. The chief benefits of the control drum controller 215 over the legacy control drum drive mechanisms are reduced mass, primarily achieved through the elimination of peripheral vessel head penetrations, but additionally through the removal of rotary seal penetrations and reduced torque at the motor or actuator. The control drum controller 215 also enables improved actuator resolution requirements.

To facilitate locating the control drum controller 215 on the exterior wall of the pressure vessel 160, the control drum controller 215 does not sit at the top proximal end or the bottom distal end of a control drum 115A. Rather, the control drum controller 215 includes a driven pulley 216A attached somewhere along the length of the control drum 115A. This driven pulley 216A, when driven, rotatably controls the control drum 115A. The control drum controller 215 then has an actuator 120A which is coupled to a tension member 217A. This tension member 217A pierces through a small opening in the pressure vessel 160, with the small opening constrained by a vessel nozzle 250A connecting the pressure vessel 160 to an actuator housing 240A containing the actuator 120A. In this example, the tension member 217A is a wire rope 218; but any type of linkage can be utilized. The tension member 217A is attached to the driven pulley 216A, and actuation by the actuator 120A applies a tension force to the tension member 217A. The tension member 217A then consequently transfers and applies that tension force to the driven pulley 216A, which further applies the tension force as a rotational force to the control drum 115A, rotating the control drum 115A.

Using this system of pulleys and wires, the control drum controller 215 may align an absorber material 117 that forms the control drum 115A to face inwards towards the nuclear reactor core 101. Consequently, by moving a reflector material 116 that also forms the control drum 115A to face outwards away from the nuclear reactor core 101, the control drum controller 215 lowers operating temperature. Alternatively, the control drum controller 215 may align the reflector material 116 to face inwards towards the nuclear reactor core 101. By moving the absorber material 117 that also forms the control drum 115A to face outwards away from the nuclear reactor core 101, the control drum controller 215 raises operating temperature. These selective temperature adjustments can all be made with the sensitive and relatively large components such as the actuator 120A of the control drum controller 215 outside the pressure vessel 160 containing the nuclear reactor core 101.

An example nuclear reactor system 100 includes a pressure vessel 160 and a nuclear reactor core 101 disposed in the pressure vessel 160. The nuclear reactor core 101 includes a plurality of fuel elements 104A-N and at least one moderator element 103A. Nuclear reactor system 100 further includes a plurality of control drums 115A-N disposed longitudinally within the pressure vessel 160 and laterally surrounding the plurality of fuel elements 104A-N and the at least one moderator element 103A to control reactivity of the nuclear reactor core 101. Each of the control drums 115A-N includes a reflector material 116 on a first portion 166 of an outer surface 165 and an absorber material 117 on a second portion 167 of the outer surface 165.

Nuclear reactor system 100 further includes a control drum controller 215. The control drum controller 215 includes a counterweight 225A that is external or internal to a control drum 115A of the plurality of control drums 115A-N to impart a reverse torque on the control drum 115A. The control drum controller 215 further includes a driven pulley 216A coupled to the counterweight 225A and to rotatably control the control drum 115A based on a torque. The control drum controller 215 further includes a tension member 217A coupled to the driven pulley 216A to rotatably control the driven pulley 216A and to apply the torque to the driven pulley 216A. The control drum controller 215 further includes an actuator 120A powered by power from a power source 154A and coupled to the tension member 217A to apply a tension force to the tension member 217A by winding or unwinding the tension member 217A.

The actuator 120A counteracts the reverse torque of the counterweight 225A with the applied tension force. The tension member 217A applies the torque to the driven pulley 216A in response to the applied tension force. Based on the applied torque, the driven pulley 216A rotatably controls the control drum 115A.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations, by way of example only, not by way of limitations. In the figures, like reference numerals refer to the same or similar elements.

PARTS LISTING

Figure 1A:
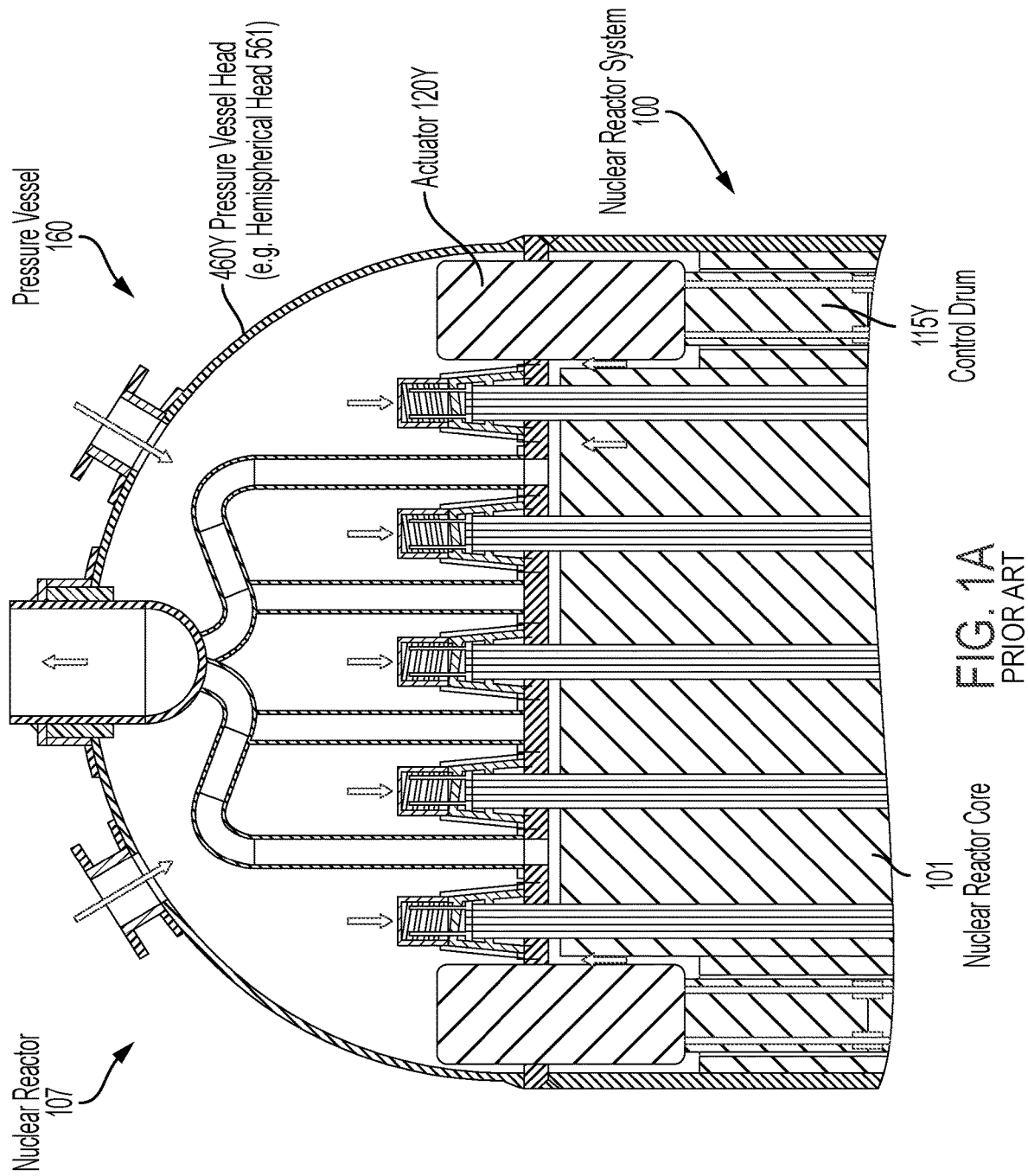
FIG. 1A is a cross-sectional view of a pressure vessel of a nuclear reactor in the prior art with a hemispherical pressure vessel head encompassing the actuators of a nuclear reactor system.

- 100 Nuclear Reactor System
- 101 Nuclear Reactor Core
- 102A-N Insulator Elements
- 103A-N Moderator Elements
- 104A-N Fuel Elements
- 107 Nuclear Reactor
- 112 Insulator Element Array
- 113 Moderator Element Array
- 114 Nuclear Fuel Tile Array
- 115A-Z Control Drums
- 116 Reflector Material
- 117 Absorber Material
- 120A-P, Y, Z Actuators
- 121A-N Moderator Coolant Passages
- 140 Reflector
- 141A-N Reflector Blocks
- 153A-B Electrical Power
- 154A Line Power Source
- 154B Non-Line Power Source
- 156 Reflector Substrate
- 157 Absorber Plate
- 158 Absorber Coating
- 160 Pressure Vessel
- 165 Outer Surface
- 166 First Portion
- 167 Second Portion
- 215 Control Drum Controller
- 216A-X Driven Pulley
- 217A-X Tension Member
- 218A-N, P-X Wire Rope
- 219A-N, P Electrical Drive Mechanism
- 221A-B Actuator Shaft
- 225A, P Counterweights
- 226A-F Idler Pulley
- 228 Wire Rope Proximal End
- 231 Control Drum Shaft
- 236A-X Driving Pulley
- 238 Wire Rope Distal End
- 240A-P Actuator Housing
- 250A-N, Z Vessel Nozzle
- 280A-B Counterweight Support Bracket
- 315 Control Drum Bracket
- 460A-B Pressure Vessel Head
- 461 Klöpper Head
- 561 Hemispherical Head
- 618, 618A-N Rod
- 619A-B Torsion Spring
- 620 First Stop
- 621 Second Stop
- 861 Pressure Vessel Top
- 862 Pressure Vessel Side
- 863 Pressure Vessel Bottom

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The term "coupled" as used herein refers to any logical or physical connection. Unless described otherwise, coupled elements or devices are not necessarily directly connected to one another and may be separated by intermediate components, elements, etc.

Unless otherwise stated, any and all measurements, values, ratings, positions, magnitudes, sizes, angles, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±5% or as much as ±10% from the stated amount. The term "approximately" or "substantially" means that the parameter value or the like varies up to ±10% from the stated amount. When used in connection with a direction, "substantially lateral" or "substantially parallel" means generally horizontal to the point of reference, for example, in a substantially sideways direction that is 162°-198° to the point of reference. When used in connection with a direction, "substantially orthogonal" means generally perpendicular to the point of reference that is 81°-99° to the point of reference.

The orientations of the nuclear reactor system 100 and nuclear reactor 107, associated components, and/or any nuclear reactor system 100 incorporating the nuclear reactor core 101, nuclear reactor 107, control drums 115A-X, actuators 120A-P counterweights 225A, P, control drum controller 215, driving pulleys 236A-P, idler pulleys 226A-F, driven pulleys 216A-N, and electrical drive mechanisms 219A-P, such as shown in any of the drawings, are given by way of example only, for illustration and discussion purposes. In operation for a particular nuclear reactor system 100, the components may be oriented in any other direction suitable to the particular application of the nuclear reactor system 100, for example upright, sideways, or any other orientation. Also, to the extent used herein, any directional term, such as lateral, longitudinal, up, down, upper, lower, top, bottom, and side, are used by way of example only, and are not limiting as to direction or orientation of any nuclear reactor system 100 or component of the nuclear reactor system 100 constructed as otherwise described herein.

The term "spring" as used herein refers to any actuator spring, tension spring, compression spring, torsional/torsion spring, mainspring style spring, or spiral spring.

FIG. 1A is a cross-sectional view of a pressure vessel 160 of a nuclear reactor 107 in the prior art with a hemispherical head 561 styled pressure vessel head 460Y encompassing the actuator(s) 120Y of a nuclear reactor system 100.

Using a hemispherical head 561 for the pressure vessel 160 is generally the lightest style pressure vessel head 460Y for a pressure vessel 160. While attempting to make the pressure vessel 160 as small and light as possible, there is little additional material budgeted between the pressure vessel 160 wall and outer edge of the reflector 140 or moderator element array 113 depicted in FIG. 2A. This means the control drum 115Y and actuator 120Y are located at the outer periphery of the pressure vessel head 460Y, requiring a significant structural reinforcement of the pressure vessel head 460Y.

The major drawback with this prior art pressure vessel head 460Y is that the design precludes the possibility of a passive decay heat system, since the pressure vessel 160 will eventually reach nearly isothermal temperatures well above the rated operating temperatures of actuator 120Y mechanisms. In an NTP type of nuclear reactor system 100, some concepts have used additional hydrogen propellant to cool the reactor during cool down, which is effective at maintaining a low operating temperature, but significantly decreases effective specific impulse ($I_{sp}$) for creation of thrust by wasting hydrogen for cooling instead of propulsion.

Figure 1B:
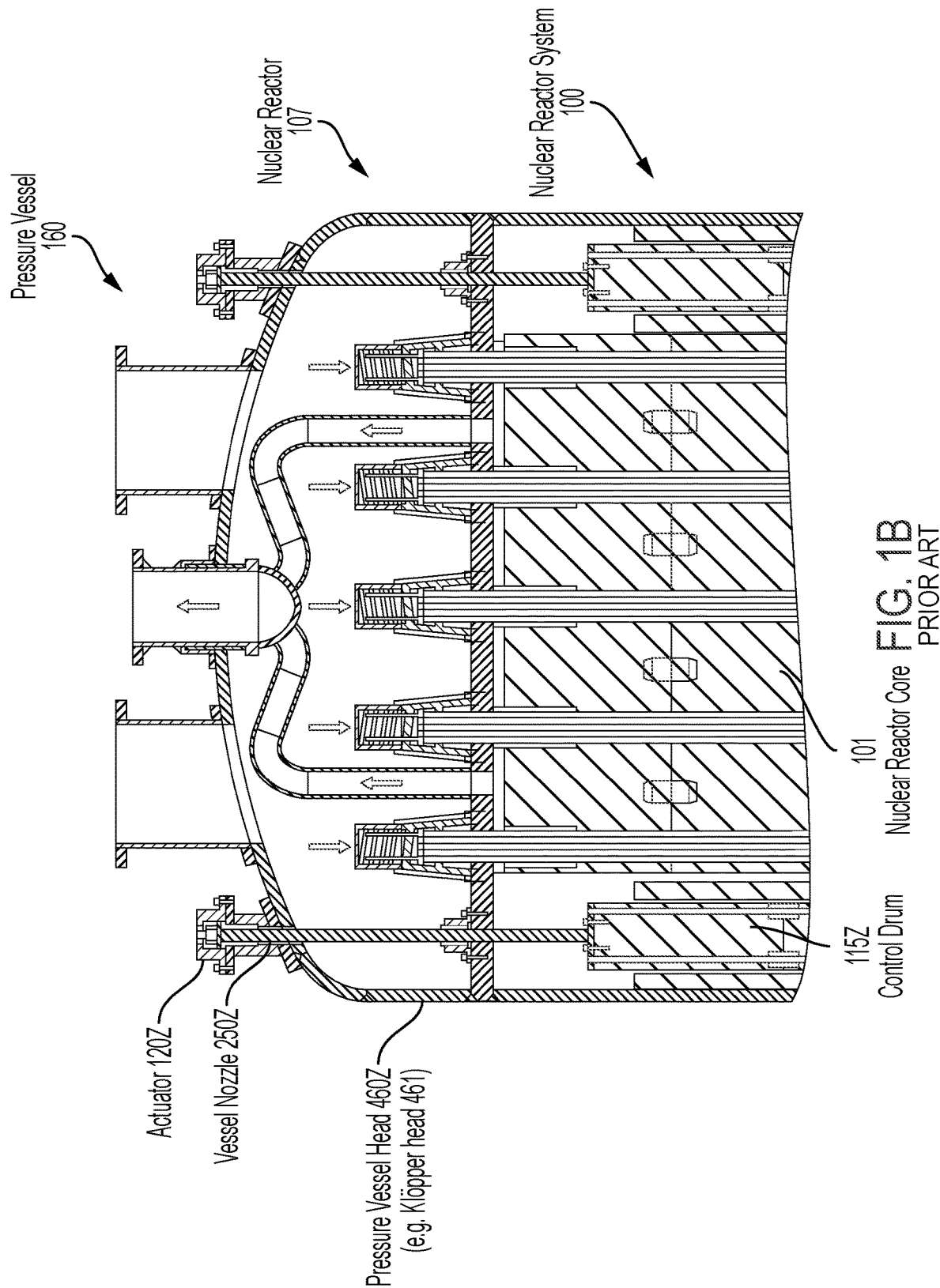
FIG. 1B is a cross-sectional view of a pressure vessel of another nuclear reactor in the prior art with a Klöpper pressure vessel head, with the actuators of a nuclear reactor system extending through the pressure vessel head.

FIG. 1B is a cross-sectional view of the pressure vessel 160 of another nuclear reactor 107 in the prior art with a Klöpper head 461 styled pressure vessel head 460Z with the actuator 120Z of the nuclear reactor system 100 extending through the pressure vessel head 460Z.

The Klöpper head 461 or torispherical head configuration locates the control drum 115Z actuator 120Z on the pressure vessel head 460Z, which drives the selection of a Klöpper head 461 with peripheral reinforcement. A packing-gland style seal is included at the upper support plate within a vessel nozzle 250Z, with a peripheral penetration at the pressure vessel head 460Z which provides mechanical support for the actuator 120Z. A major drawback of the configuration of FIG. 1B is that the torque is transmitted to the control drum 115Z through the use of a shaft, which ends up being somewhat substantially large in mass and size, to provide stable torque over the length required.

Figure 1C:
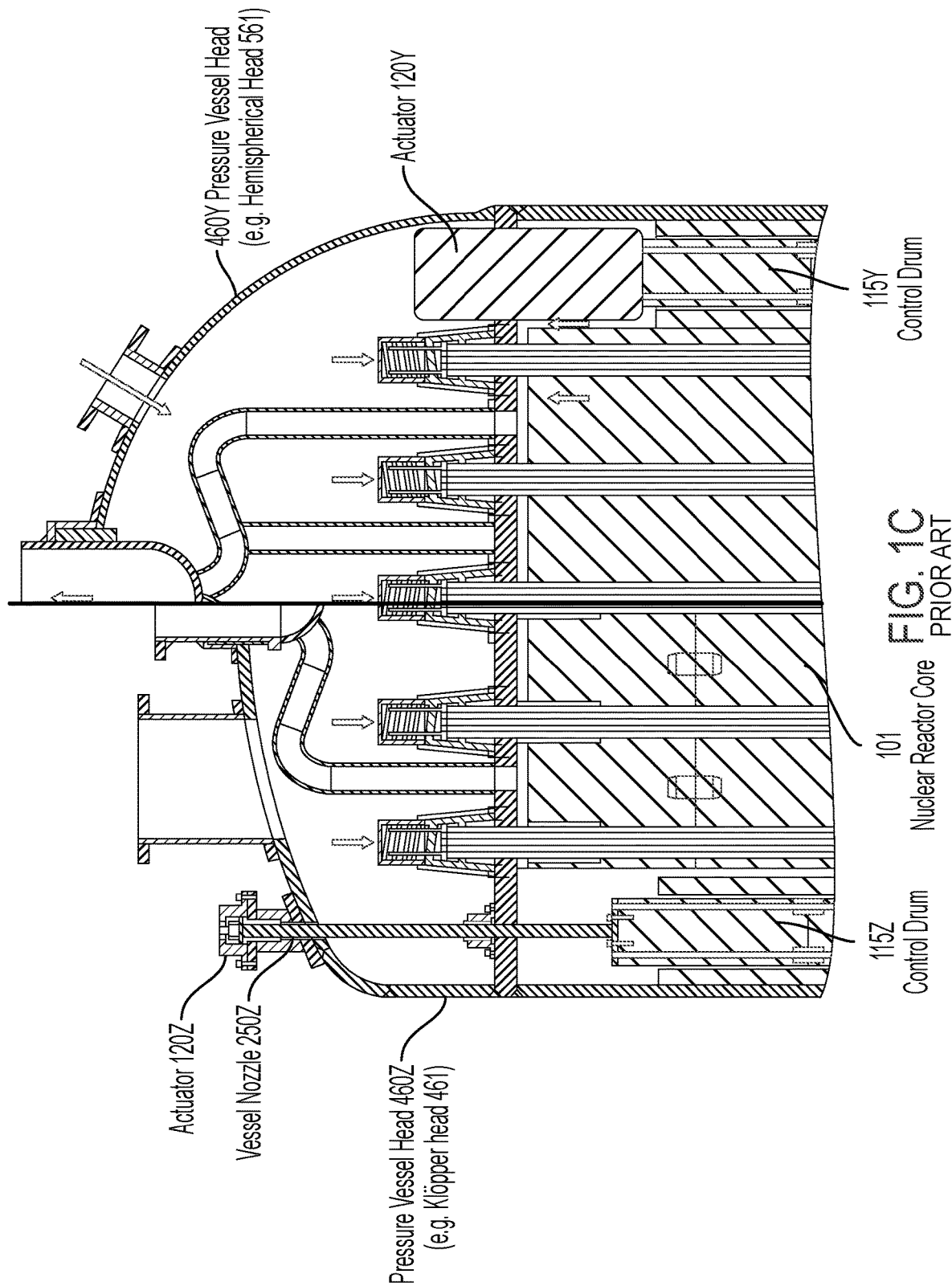
FIG. 1C is a cross-sectional view of the Klöpper pressure vessel head of FIG. 1B depicted next to the hemispherical pressure vessel head of FIG. 1A in order to illustrate differences between the two prior art pressure vessel head styles.

FIG. 1C is a cross-sectional view of the Klöpper head 461 styled pressure vessel head 460Z of FIG. 1B depicted next to the hemispherical head 561 styled pressure vessel head of 460Y FIG. 1A in order to illustrate differences between the two prior art pressure vessel head 460Y-Z styles.

This combination view illustrates the downside with a hemispherical head 561, compared to more traditional 2:1 elliptical or Klöpper heads 461: the high curvature toward the periphery of the pressure vessel 160. This high curvature results in a larger volume that cannot contain fuel elements 104A-N, and therefore the overall volume efficiency of the entire pressure vessel 160 is decreased. Alternatively, utilizing the Klöpper head 461 adds significant complexity and mass penalty in the form of additional penetration and seals: the hemispherical head 561 contains all of the actuator 120Y components. With the Klöpper head 461, the lack of inherent torque reduction between the actuator 120Z and the control drum 115Z means the actuator 120Z must be able to provide the full torque to overcome any kind of spring-back safety mechanism as well as friction and inertia. In FIG. 1C, when an actuator 120Y-Z is coupled to the same shaft within the control drum 115Y, the actuator 120Y must be within the pressure vessel head 460Y. Alternatively, the actuator 120Y coupled to the same shaft within the control drum 115Z can be mounted above the pressure vessel head 460Z, and pierce through the pressure vessel head 460Z via a piercing hole. The piercing hole made through the pressure vessel head 460Z must have a diameter as wide as the diameter of the shaft of the control drum 115Z, and the piercing hole must be sealed with a vessel nozzle 250Z of a large size that adds design complexity.

In FIG. 1C, on the right of the figure a hemispherical head 561 is shown containing the actuator 120Y, and on the left of the figure a Klöpper head 461 is shown with the shaft of the actuator 120Z piercing the Klöpper head 461. However, the shapes or curves of the pressure vessel heads 460Y-Z can be utilized with the actuator 120Y-Z design of the alternative pressure vessel head 460Y-Z, without properly resolving the underlying design issues. Meaning, a pressure vessel 160 may be designed with Klöpper head 461 large enough to fully contain the actuator 120Z without utilizing a vessel nozzle 250Z. Such a design would function similarly to the pressure vessel 160 of FIG. 1A, and would have the same, or arguably worse, issues with requiring a significant structural reinforcement of the pressure vessel head 461. Additionally, a pressure vessel 160 may be designed with a hemispherical head 561 utilizing an external actuator 120Y, connected to the control drum 115Y by a shaft piercing the hemispherical head 561. Such a design would function similarly to the nuclear pressure vessel 160 of FIG. 1B, and would have the same, or arguably worse, issues regarding sealing the piercing hole through which the shaft connecting the actuator 120Y and control drum 115Y passes—sealing the piercing hole adds design complexity.

Figure 2A:
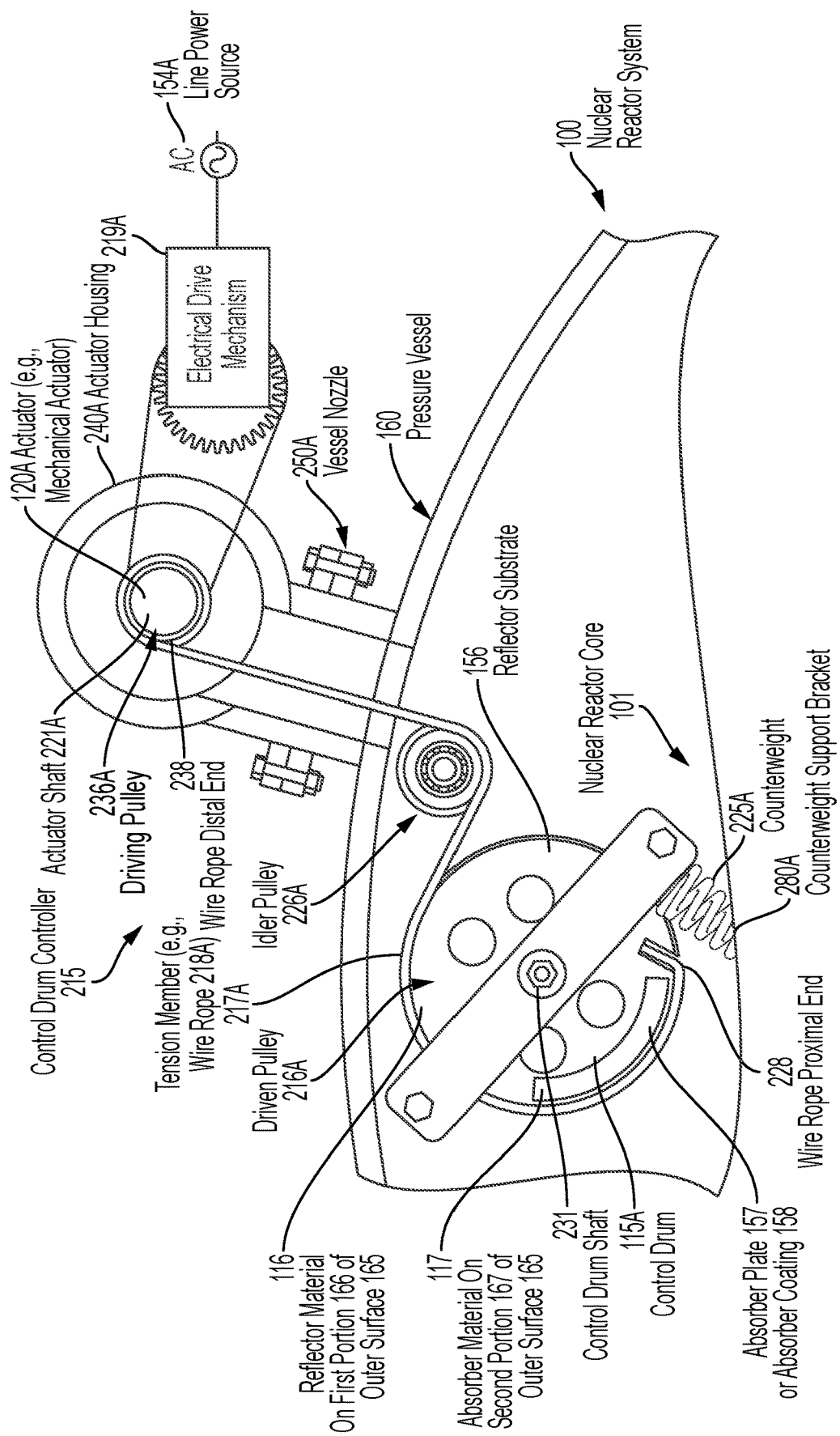
FIG. 2A illustrates the control drum controller of the nuclear reactor system, in which an actuator of the control drum controller includes a wire rope type of tension member and an idler pulley.
Figure 2B:
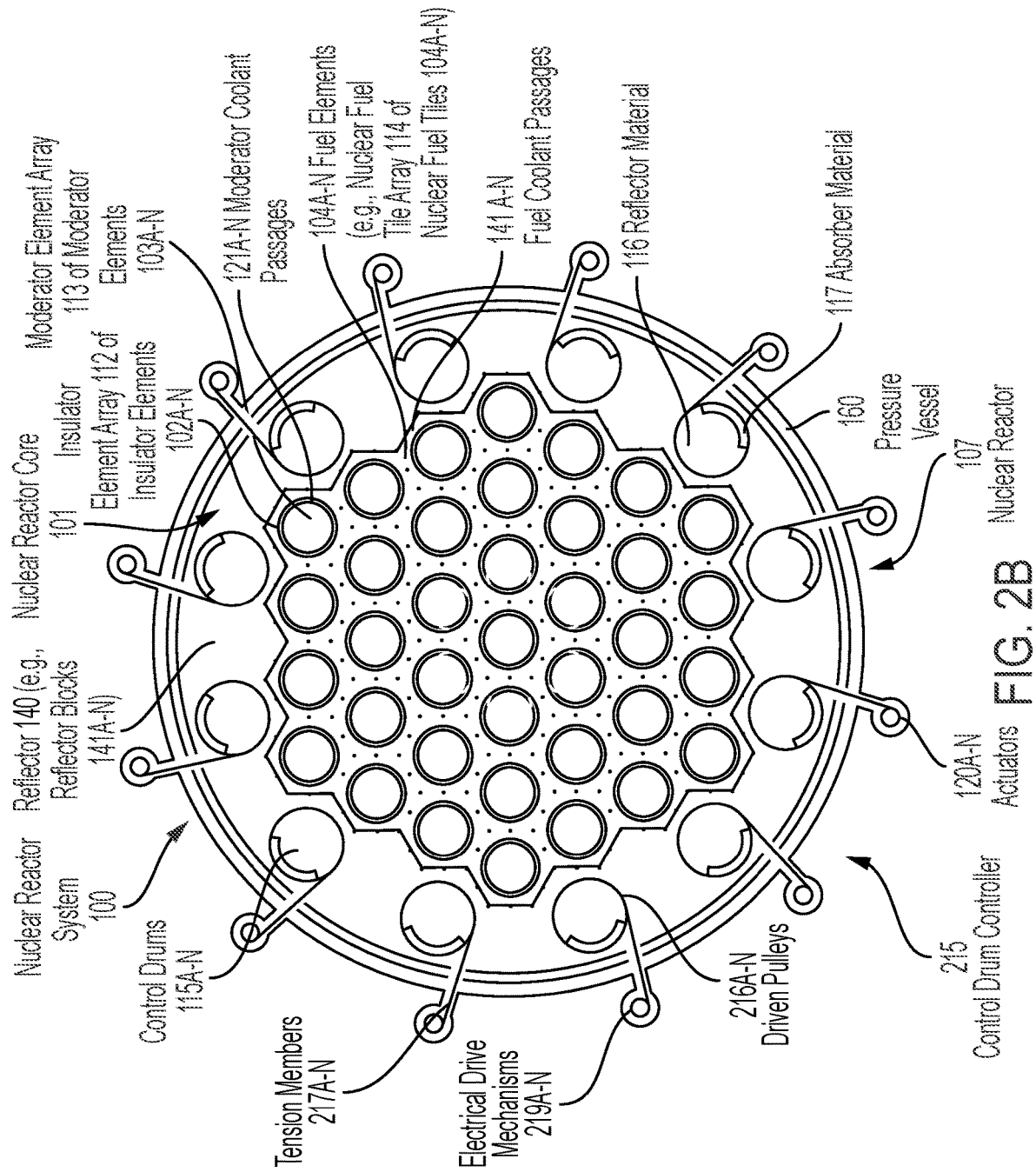
FIG. 2B is a cross-sectional view of a nuclear reactor core that can be implemented in the nuclear reactor system of FIG. 2A, with the control drums, counterweights, and tension members of the control drum controller.

FIG. 2A illustrates a nuclear reactor system 100 that implements a control drum controller 215, a control drum 115A, an electrical drive mechanism 219A, and a wire rope 218 type of tension member 217A. FIG. 2B is a cross-sectional view of a nuclear reactor core 101 that can be implemented in the nuclear reactor system 100 of FIG. 2A, control drums 115A-N, counterweights 225A-N, tension members 217A-N, and actuators 120A-N of the control drum controller 215.

Figure 3:
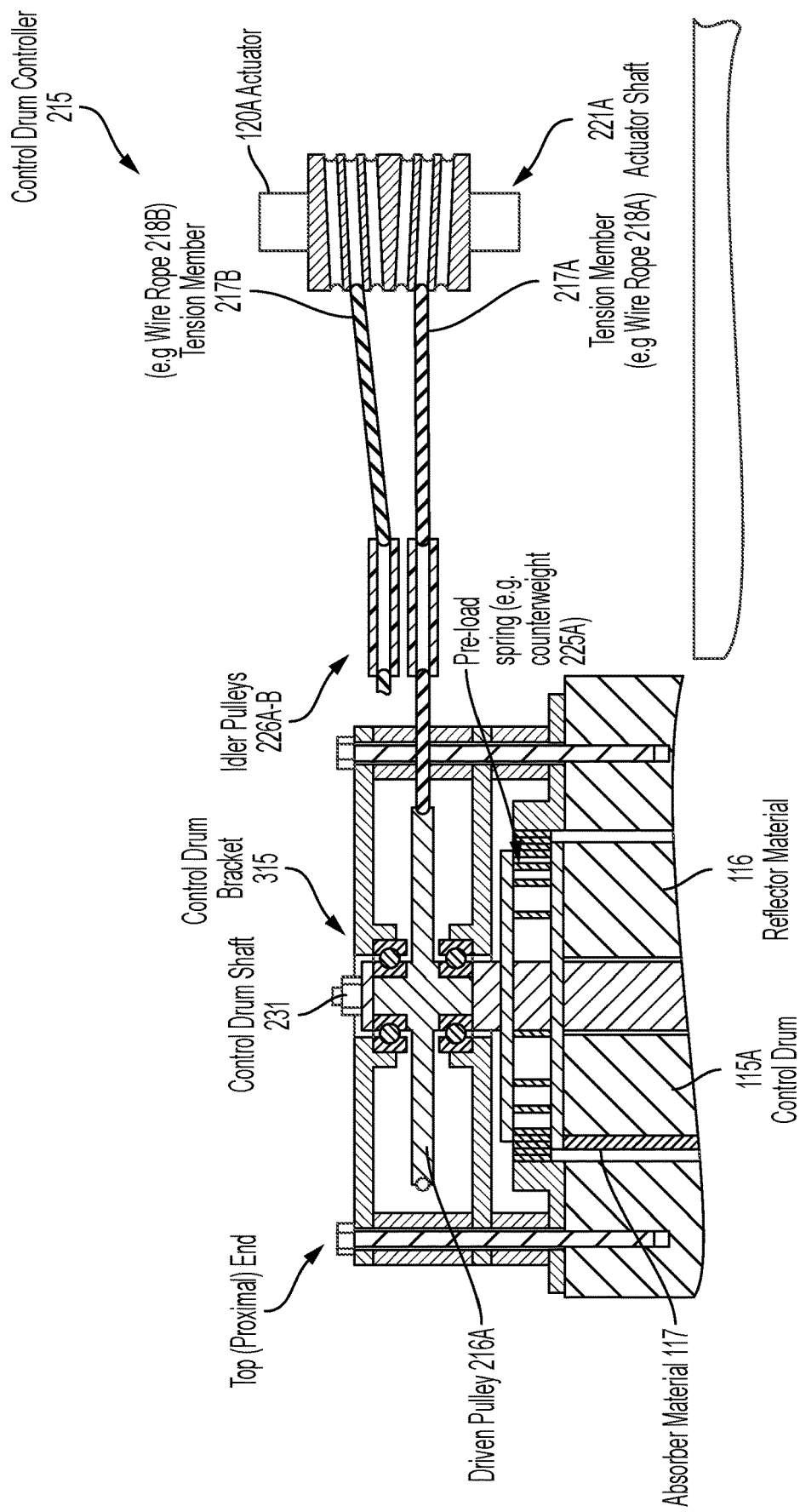
FIG. 3 is a cross-sectional view of a control drum, and a side view of an actuator and idler pulleys of the control drum controller of the nuclear reactor system of FIGS. 2A-B.

In the examples of FIGS. 2A-B and 3, each tension member 217A-N is a separate and distinct wire rope 218A-N. In other words, there is one wire rope 218A-N per a respective actuator 120A-N, a respective electrical device mechanism 219A-N, and respective control drum 115A-N. However, the wire ropes 218A-N (or other types of tension members 217A-N, such as rods 618A-N of FIG. 6) do not need to be discrete units assigned to a respective actuator 120A-N. For example, the wire ropes 218A-N can be bundled, grouped, or otherwise connected together to one or more actuators 120A-N, electrical drive mechanisms 219A-N, and/or control drums 115A-N.

The primary benefits of the control drum controller 215 are: (1) removing the head penetration re-enforcement and utilize a hemispherical head 561 allowing significant mass saving from the pressure vessel 160; (2) removing rotary shaft seals in the vessel nozzle 250Z as part of the head or support plates; (3) providing an inherently mass-efficient torque transmission by replacing a torque tube with a small diameter wire rope 218 (see FIG. 2A); (4) reducing the torque requirements on the control drum actuator 120Y-Z;

(5) allowing the option to include a stiffer snap-back spring (counterweights 225A-P of FIGS. 2-5, 7; or torsion springs 619A-B of FIG. 6) to improve safety or reduce actuator torque to improve mass; (6) significantly improved capability for neutronic and thermal shielding of control drum actuators 120A-P (see FIGS. 2-8); and (7) improved flexibility on the type and location of actuators 120A-P used, since the small diameter wire rope 218 can be routed to far more locations than a torque shaft could be.

Referring to both FIGS. 2A-B, nuclear reactor system 100 includes a pressure vessel 160 and a nuclear reactor core 101 disposed in the pressure vessel 160. The nuclear reactor core 101 includes a plurality of fuel elements 104A-N and at least one moderator element 103A. The fuel element 104A emits free neutrons, and is designed to generate heat energy within the nuclear reactor core 101 of the nuclear reactor system 100. In the example of FIG. 2B, a moderator element 103A is paired with the fuel element 104A, and is designed to slow down fast neutrons while still allowing the nuclear reactor core 101 to produce heat energy. Nuclear reactor system 100 further includes a plurality of control drums 115A-N disposed longitudinally within the pressure vessel 160 and laterally surrounding the plurality of fuel elements 104A-N and the at least one moderator element 103A to control reactivity of the nuclear reactor core 101. Each of the control drums 115A-N includes a reflector material 116 on a first portion 166 of an outer surface 165 and an absorber material 117 on a second portion 167 of the outer surface 165.

Nuclear reactor system 100 further includes a control drum controller 215. The control drum controller 215 refers to the entire system for logically controlling the control drums 115A-N, even if the components which control the control drums 115A-N, such as the actuators 120A-N, all physically operate independently. Control drum controller 215 includes a counterweight 225A that is external or internal to a control drum 115A of the plurality of control drums 115A-N to impart a reverse torque on the control drum 115A. The control drum controller 215 further includes a driving pulley 236A coupled to the counterweight 225A and to rotatably control the control drum 115A based on a torque. The control drum controller 215 still further includes a tension member 217A coupled to the driven pulley 216A to rotatably control the driven pulley 216A and to apply the torque to the driven pulley 216A. The control drum controller 215 also includes an actuator 120A powered by power from a power source 154A and coupled to the tension member 217A to apply a tension force to the tension member 217A by winding or unwinding the tension member 217A.

The actuator 120A counteracts the reverse torque of the counterweight 225A with the applied tension force. The tension member 217A applies the torque to the driven pulley 216A in response to the applied tension force. Based on the applied torque, the driven pulley 216A rotatably controls the control drum 115A.

The line power source 154A shown in FIG. 2A conveys electrical power 153A, sometimes referred to as grid power, household power, household electricity, house current, powerline, domestic power, wall power, line power, AC power, city power, street power that is produced by an electric utility provider. The electrical power 153A can be alternating current (AC) electric power produced and delivered via AC mains to homes and businesses. Electrical power 153A can be independent (e.g., separate) from the electrical energy produced from the nuclear reactor system 100 or can be electrical energy produced from the nuclear reactor system 100 looped back to the control drums 115A-N. Independence of the line power source 154A from the nuclear reactor system 100 may avoid a runaway nuclear reactor situation. If the nuclear reactor core 101 conveys the electrical power 153A that keeps the reflector material 116 facing inwards towards the nuclear reactor core 101, then a supercritical nuclear reactor core 101 continues to convey the electrical power 153A even though the neutron flux should be reduced. By establishing an independent line power source 154A, the electrical power 153A can be cut independently from the nuclear reactor core 101.

Figure 7:
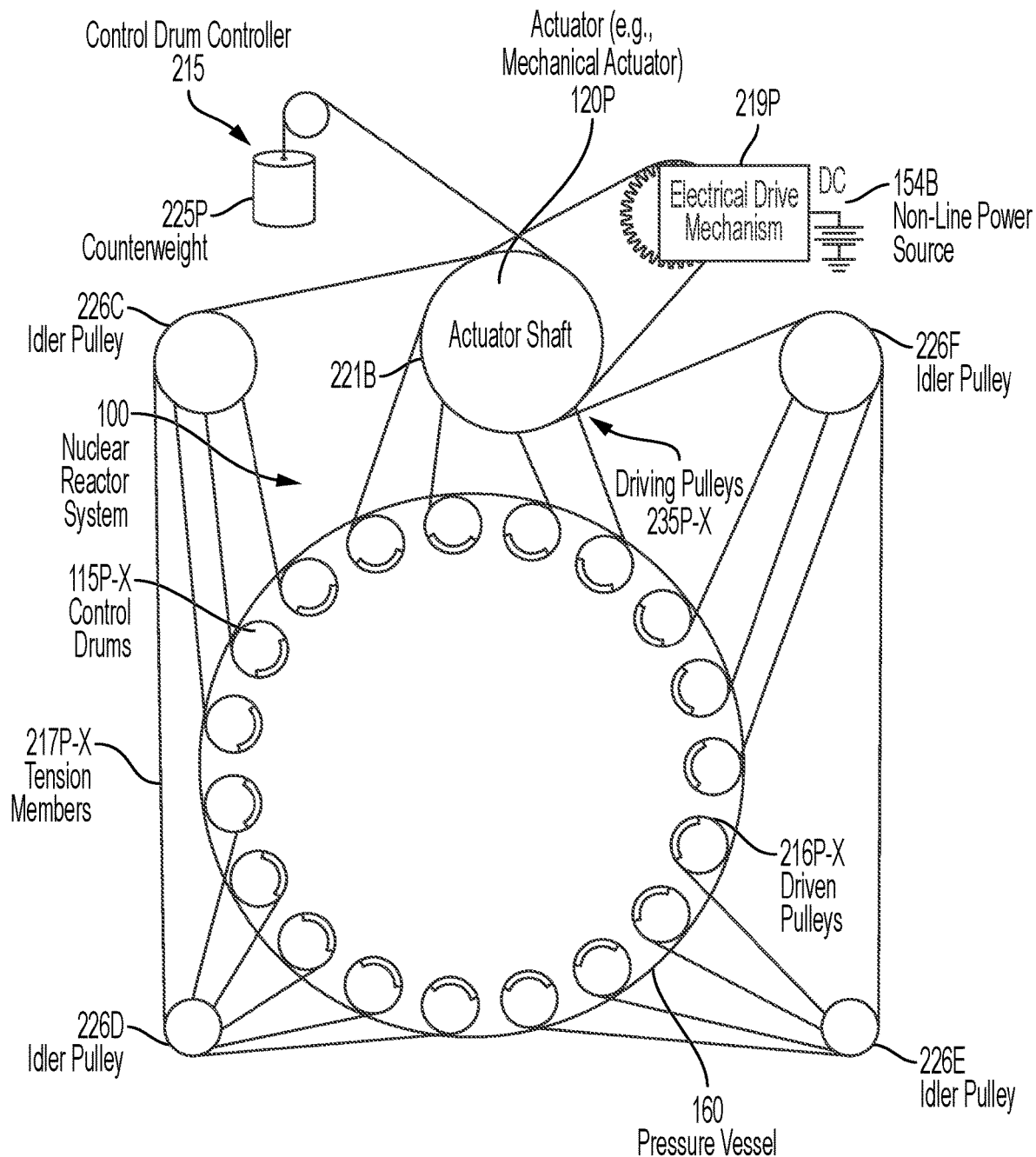
FIG. 7 illustrates a second variation of nuclear reactor system of FIGS. 2A-B with control drums rotatably controlled by a single actuator, a single electrical drive mechanism, and a single counterweight.

Non-line power source 154B shown in FIG. 7 conveys electrical power 153B and can be a battery (e.g., charged by electrical energy produced from the nuclear reactor system 100 or a separate energy source), solar panel, or any other AC or DC source (e.g. a generator) that is not line powered. The line power source 154A, non-line power source 154B, or both the line power source 154A and the non-line power source 154B can supply electrical power 153A-B to the electrical drive mechanism 219A.

Referring now more specifically to FIG. 2B, a pressure vessel 160 includes the nuclear reactor core 101 disposed therein, as well as the control drums 115A-N. Control drums 115A-N regulate the neutron population in the nuclear reactor core 101 and nuclear reactor power level like control rods in other nuclear reactor systems. To increase or decrease neutron flux in the nuclear reactor core 101, the control drums 115A-N are rotated; whereas control rods are inserted or removed from the nuclear reactor core 101. Because the control drums 115A-N are rotated to adjust reactivity of the nuclear reactor core 101, instead of being inserted and removed, the control drums 115A-N have a permanently fixed longitudinal position: the control drums 115A-N do not move in or out of the nuclear reactor core 101 or pressure vessel 160. There are risks that control rods may not insert fully into the nuclear reactor core 101 due to misalignment or blockages in a control rod hole, and utilizing control drums 115A-N advantageously reduces those risks.

As shown in FIG. 2A, a first portion 166 of an outer surface 165 of the control drum 115A includes a reflector material 116, which is generally formed of a material with a high elastic scattering neutron cross section. When the reflector material 116 faces inwards towards the nuclear reactor core 101, the neutron flux increases, which increases the reactivity and operating temperature of the nuclear reactor core 101. A second portion 167 of the outer surface 165 of the control drum 115A includes an absorber material 117, which can be formed of a neutron poison. Neutron poisons are isotopes or molecules with a high absorption neutron cross section particularly suited to absorbing free neutrons. When the absorber material 117 faces inwards towards the nuclear reactor core 101, the neutron flux decreases, which decreases the reactivity and operating temperature of the nuclear reactor core 101.

Nuclear reactor system 100 includes the electrical drive mechanism 219A to selectively rotate the control drum 115A or a plurality of control drums 115A-N to face either the absorber material 117 towards the nuclear reactor core 101, decreasing nuclear flux and operating temperature, or the reflector material 116 towards the nuclear reactor core 101, increasing nuclear flux and operating temperature. Electrical drive mechanism 219A includes a motor, for example. The electrical drive mechanism 219A can be integrated directly into the actuator 120A itself, or can be a separate component for converting electrical energy into mechanical energy: the electrical drive mechanisms 219A-B may be entirely obviated in examples where mechanical force generated by an operator is used: for example pulling a lever or turning a crank; or alternatively using a propulsive force from a propellant. Hence, the electrical drive mechanism 219A and the actuator 120A can be electrical, mechanical, thermal, magnetic, chemical, or a combination thereof. In the figures, the electrical drive mechanism 219A-B is depicted as a separate component for easier readability. Moreover, the electrical drive mechanism 219A and the actuator 120A can be controlled by electric signals conveyed from an external computer, a digital circuit, an analog circuit, or a combination thereof.

Control drum controller 215 includes an actuator 120A, such as a mechanical actuator. In FIG. 2A, the actuator 120A can include a simple axle or actuator shaft 221A. The actuator shaft 221A of the actuator 120A either comprises or is coupled to a driving pulley 236A. This driving pulley 236A of the control drum controller 215 can be wound or unwound by the actuator shaft 221A that is mechanically linked to the electrical drive mechanism 219A. The driving pulley 236A may be separately articulable from the actuator shaft 221A, or the driving pulley 236A can be the actuator shaft 221A itself. There is no preferred material for the driven pulley 216A, driving pulley 236A, idler pulley 226A, or any structural elements not explicitly disclosed connected to these pulleys 216A, 226A, 236A. However, Inconel® 718 alloy and stainless steel 316 alloy are likely options due to their compatibility with coolant and high operating temperatures.

A tension member 217A of the control drum controller 215, in this example a wire rope 218, is anchored by the wire rope distal end 238 into the driving pulley 236A, and winding or unwinding the driving pulley 236A can wind or unwind the wire rope 218 around the driven pulley 216A and therefore around the actuator shaft 221A. Winding the wire rope 218 pulls the wire rope toward the actuator shaft 221A and away from the interior of the pressure vessel 160, thereby increasing tension on the wire rope 218. The wire rope 218 can be metal, carbon fiber, or another high-performance fibrous material. The wire rope 218 can be braided or twisted, and can be made partially or wholly out of flat, thin metal sections. The construction of the wire rope 218 type of tension members 217A-X are likely to be stainless steel 316 (SS316) alloy, though flat rolled thin sheet tungsten alloy, such as tungsten rhenium (WRe) alloy (e.g., WRe25% alloy with 25% Rhenium) has good ductility and strength at nuclear reactor system 100 temperatures.

Advantageously, when the radius of the actuator shaft 221A and driving pulley 236A is smaller than the radius of the control drum 115A, then winding and unwinding the wire rope 218 improves the actuator 120A resolution over the actuators 120Y-Z of the prior art. For example, a half turn of the actuator 120A can turn the control drum 115A less than one half turn, whereas in the prior art a half turn of the actuators 120Y-Z results in a half turn of the control drums 115Y-Z.

The pressure vessel 160 is pressurized to a relatively high internal pressure. To avoid large forces associated with high pressure drops, the electrical drive mechanism 219A and the actuator 120A can be housed within pressure bearing actuator housing 240A, such as a tubular extension from the pressure vessel 160 connected by a vessel nozzle 250A.

The wire rope 218 has a wire rope proximal end 228, anchored into a driven pulley 216A of the control drum controller 215. As the tension is increased on the wire rope 218 by the electrical drive mechanism 219A via the driving pulley 236A, that tension force is transferred through the wire rope 218, and attempts to pull the wire rope proximal end 228 toward the actuator shaft 221A. The portion of the wire rope 218 near the wire rope proximal end 228 is wrapped around the driven pulley 216A, and therefore as the wire rope proximal end 228 is pulled toward the exterior of the pressure vessel 160, the wire rope 218 unwinds from its wrapped position around the driven pulley 216A, thereby turning the driven pulley 216A.

In this manner, engagement of the electrical drive mechanism 219A turns the driving pulley 236A of the actuator 120A, causing the driving pulley 236A to rotate around or with the actuator shaft 221A of the actuator 120A. The rotation of the driving pulley 236A pulls the tension member 217A (the wire rope 218) toward the driving pulley 236A, and away from the driven pulley 216A. In other words, the driving pulley 236A is reeling in the wire rope 218, and therefore pulling the far end of the wire rope 218 toward itself. Pulling the tension member 217A away from the anchor point of the wire rope proximal end 228 within the driven pulley 216A causes the driven pulley 216A to rotate. The driven pulley 216A is directly connected to the control drum shaft 231 of the control drum 115A. Therefore, rotating the driven pulley 216A rotates the control drum 115A in the same direction as the driven pulley 216A rotates.

Utilizing this sequence of connected components, engaging the electrical drive mechanism 219A can turn the control drum 115A such that the absorber material 117 on the second portion 167 of the outer surface 165 does not face inward, towards the fuel elements 104A-N, but instead the absorber material 117 faces away from the fuel elements 104A-N. Consequently, engaging the electrical drive mechanism 219A can turn the control drum 115A such that the reflector material 116 on the first portion 166 of the outer surface 165 does not face outward, away from the fuel elements 104A-N, but instead the reflector material 116 faces towards from the fuel elements 104A-N. Facing the absorber material 117 away from the fuel elements 104A-N and the reflector material 116 toward the fuel elements 104A-N generally increases neutron fluence and reactor heat in the nuclear reactor core 101.

Control drum controller 215 further includes the counterweight 225A, which in this example is a spring applying a reverse torque to the control drum 115A. The spring is fabricated from stainless steel 316 alloy or tungsten alloy to maintain ductility under elevated hydrogen pressures and temperatures. When the counterweight 225A is a spring, the counterweight 225A is connected to a counterweight support bracket 280A. The counterweight support bracket 280A fixes the counterweight 225A spring to a non-rotating reference frame. Alternatively, the counterweight 225A can be a weighted segment of the control drum 115A, utilizing gravity to apply a reverse torque to the control drum 115A. The counterweight 225A can be implemented like any counterweight 225A-R described in FIGS. 1-5 and the associated text of International Application No. PCT/US2020/054189 to Ultra Safe Nuclear Corporation of Seattle, Washington, filed Oct. 4, 2020, titled "Automatic Shutdown Controller for Nuclear Reactor System with Control Drums," which published as International Publication No. WO 2021/067902 on Apr. 8, 2021, the entirety of which is incorporated by reference herein.

The electrical drive mechanism 219A can be configured to only output a torque equal to the reverse torque generated by the counterweight 225A at the apex position of the counterweight 225A, or at the full compression of the counterweight 225A. The actuator 120A and the electrical drive mechanism 219A are disposed outside the pressure vessel 160. The counterweight 225A is disposed within the pressure vessel 160, but in some designs could also place the counterweight 225A outside the pressure vessel 160. With the addition of the control drum controller 215 to the nuclear reactor system 100, the electrical drive mechanism 219A still selectively increases or decreases neutron flux and operating temperature in the nuclear reactor core 101.

When the electrical drive mechanism 219A turns off or becomes inoperable, for example, due to a loss or interruption of electrical power 153A from a power source 154A, then torque generated by the actuator 120A is reduced, the torque of the driving pulley 236A is reduced, the pull of the tension member 217A is reduced, and the torque on the control drum 115A from the driven pulley 216A is reduced. At this point, the counterweight 225A is able to overcome the torque of the driven pulley 216A with the reverse torque generated by the counterweight 225A and turn the control drum 115A. The counterweight 225A turns the control drum 115A when the counterweight 225A does not have minimum potential energy, i.e., when the counterweight 225A spring is fully extended, or a weighted counterweight 225A is at a nadir position (e.g., lowest point) of a pendulum arc of that weighted counterweight 225A.

When the counterweight 225A reverse torque overcomes the torque specifically of the driven pulley 216A and thereby the torque of the actuator 120A and the intervening linkages, the counterweight 225A turns the control drum 115A such that the absorber material 117 on the second portion 167 of the outer surface 165 does not face outward, away from the fuel elements 104A-N, but instead the absorber material 117 faces toward from the fuel elements 104A-N. Consequently, the reverse torque of the counterweight 225A overcoming the torque of the driven pulley 216A turns the control drum 115A such that the reflector material 116 on the first portion 166 of the outer surface 165 does not face inward, toward from the fuel elements 104A-N, but instead the reflector material 116 faces outward, away from the fuel elements 104A-N. Facing the absorber material 117 toward from the fuel elements 104A-N and the reflector material 116 away from the fuel elements generally decreases neutron fluence and reactor heat in the nuclear reactor core 101.

In FIG. 2A, the electrical device mechanism 219A has lost or interrupted electrical power 153A from the power source 154A. Hence, the absorber material 117 of the control drum 115A is facing inwards towards the fuel element 104A of the nuclear reactor core 101 and the other control drums 115B-N are similarly facing inwards. In FIG. 2B, the electrical device mechanisms 219A-N is receiving electrical power 153A from the power source 154A; or, the electrical device mechanisms 219A-N previously had electrical power 153A, and a locking mechanism within the control drum controller 215 is contravening the reverse torque of the counterweights 225A-N. Hence, the absorber material 117 of the control drums 115A-N are facing outwards away from the fuel elements 104A-N of the nuclear reactor core 101 and the reflector material 116 is facing inwards towards the fuel elements 104A-N.

The control drum controller 215 implementation of FIG. 2A is both gravitationally and centrifugally agnostic. Additionally, the spring of the counterweight 225A can be oriented in any direction; whereas, a counterweight 225P utilizing mass (as depicted in FIG. 7) necessarily must be oriented, such that the external force (e.g., gravity or centrifugal) moves the counterweight 225P from the apex position of the counterweight 225P to the nadir position of the counterweight 225P.

In FIG. 2A, the counterweight 225A is oriented in a decompressed position, and cannot further rotate the control drum 115A. However, when the control drum 115A is oriented as shown in FIG. 2B, then the counterweight 225A is in a compressed position and will rotates the control drum 115A approximately 180 degrees as the counterweight 225A decompresses from the compressed position of FIG. 2B to the compressed position of FIG. 2A, rotating the control drum 115A around a center axis aligned with control drum shaft 231. The counterweight 225A spring is compressed by the force of the electrical drive mechanism 219A, applied by the driving pulley 236A, applied by the tension member 217A, applied by the driven pulley 216A. Note that a locking mechanism could exist within the actuator 120A or the electrical drive mechanism 219A, thereby maintaining the superior torque force of the control drum controller 215 over the reverse torque force of the counterweight 225A of the control drum controller 215, without needing to maintain electrical power 153A from the line power source 154A.

During availability of the electrical power from the power source 154A of the nuclear reactor system 100, the electrical drive mechanism 219A can selectively increase or decrease neutron flux of the nuclear reactor core 101. To rapidly decrease neutron flux and achieve a decreased flux state (see FIG. 2A), the electrical drive mechanism 219A can rotate the control drum 115A utilizing the control drum controller 215 to maximally expose the absorber material 117 of the control drum 115A to the fuel elements 104A-N of the nuclear reactor core 101, thereby absorbing more free neutrons and decreasing neutron flux. To rapidly increase neutron flux and achieve an increased flux state (see FIG. 2B), the electrical drive mechanism 219A can rotate the control drum 115A via the control drum controller 215 to maximally expose the reflector material 116 of the control drum 115A to the fuel elements 104A-N of the nuclear reactor core 101, thereby reflecting more free neutrons and increasing neutron flux. To make an intermediate adjustment or sustain a continuous level of neutron flux, the electrical drive mechanism 219A can rotate the control drum 115A via the control drum controller 215 to a partial exposure of the absorber material 117 of the control drum 115A to the fuel elements 104A-N of nuclear reactor core 101.

Electrical drive mechanism 219A can maintain an increased flux state by actively rotating the actuator 120A which ultimately rotates the control drum 115A. The counterweight 225A imparts a reverse torque to attempt to rotate the control drum 115A in the opposite direction, as the counterweight 225A attempts to decompress from the compressed position of counterweight 225A to the decompressed position of counterweight 225A. When the electrical drive mechanism 219A shuts off during the loss or interruption of electrical power 153A from the power source 154A, the force of the decompressing counterweight 225A spring overcomes the now-absent force of the drive mechanism 219A, and the control drum 115A rotates from the increased flux state (see FIG. 2B) in which the reflector material 116 is facing inwards towards the nuclear reactor core 101, to the decreased flux state (see FIG. 2A) in which the absorber material 117 is facing inwards towards the nuclear reactor core 101.

Decompressing the counterweight 225A can also keep the wire rope 218 taut, so that there is not slack in the wire rope 218 if the actuator 120A reduces or stops providing torque. In designing the control drum controller 215, it can be advantageous to redirect the wire rope 218 type of tension member 217A, such that the wire rope 218 is not always substantially parallel to itself. An idler pulley 226A is able to change the direction of the wire rope 218, e.g., in a substantially orthogonal direction, for example by changing the direction of the wire rope 218 from following a tangent vector relative to the pressure vessel 160 (around the nuclear reactor core 101) to following a normal vector relative to the pressure vessel 160 (away from the nuclear reactor core 101). In this example, this allows the wire rope 218 to penetrate the pressure vessel 160 on the normal vector, and then be redirected via the idler pulley 226A to a tangent vector in order to begin wrapping around the driven pulley 216A. An idler pulley 226A can also allow a single driving pulley 236A to turn multiple driven pulleys 216A-B, by redirecting multiple tension members 217A-B connected to the single driving pulley 236A toward multiple driven pulleys 216A-B.

Consolidating and straightening tension member 217A can allow for a smaller vessel nozzle 250A. The vessel nozzle 250A connects the actuator housing 240A to the pressure vessel 160. The actuator housing 240A contains the actuator 120A, actuator shaft 221A, driving pulley 236A, and the wire rope distal end 238. The actuator housing 240A can also contain the electrical drive mechanism 219A itself. The vessel nozzle 250A accommodates the tension member 217A, and therefore using a narrow but strong tension member 217A such a wire rope 218 allows for a small opening in the vessel nozzle 250A. As discussed in the prior art, a large vessel nozzle 250Z (as shown in FIGS. 1B-C) needs to be heavily reinforced, is a point of failure, and increases complexity. Advantageously, the control drum controller 215 enables reduction of the opening of the vessel nozzle 250A (as shown in FIGS. 2A, 4-6, and 8), which improves the stability of the pressure vessel 160, and the nuclear reactor system 100.

In the implementation of FIG. 2B, the plurality of fuel elements 104A-N are arranged as a nuclear fuel tile array 114 of nuclear fuel tiles 104A-N and the nuclear reactor core 101 includes a plurality of moderator elements 103A-N. Such an implementation of the nuclear reactor core 101 is described in International Application No. PCT/US2020/054190, filed on Oct. 4, 2020, titled "Nuclear Reactor Core Architecture with Enhanced Heat Transfer and Safety," which published as International Publication No. WO 2021/067903 on Apr. 8, 2021, the entirety of which is incorporated by reference herein. In a second example, the nuclear reactor core 101 can be implemented like the nuclear reactor core 110 described in FIGS. 3-4 and the associated text of U.S. Pat. No. 10,643,754 to Ultra Safe Nuclear Corporation of Seattle, Washington, issued May 5, 2020, titled "Passive Reactivity Control of Nuclear Thermal Propulsion Reactors" the entirety of which is incorporated by reference herein. In the second example, the fuel elements 104A-N can be implemented like the fuel elements 310A-N, and the moderator elements 103A-N can be implemented like the tie tubes 320A-N described in FIGS. 3-4 and the associated text of U.S. Pat. No. 10,643,754.

In a third example, the nuclear reactor core 101 can be implemented like the nuclear reactor core 101 described in FIG. 2C and the associated text of U.S. Patent Pub. No. 2020/0027587 to Ultra Safe Nuclear Corporation of Seattle, Washington, published Jan. 23, 2020, titled "Composite Moderator for Nuclear Reactor Systems," the entirety of which is incorporated by reference herein. In the third example, the fuel elements 104A-N can be implemented like the fuel elements 102A-N and the moderator elements 103A-N can be implemented like the composite moderator blocks described in FIG. 2C and the associated text of U.S. Patent Pub. No. 2020/0027587.

Nuclear reactor 107 includes a reflector 140 (e.g., an outer reflector region) located inside the pressure vessel 160. Reflector 140 includes a plurality of reflector blocks 141A-N laterally surrounding the plurality of fuel elements 104A-N and the at least one moderator element 103A.

Nuclear reactor 107 includes the nuclear reactor core 101, in which a controlled nuclear chain reaction occurs, and energy is released. The neutron chain reaction in the nuclear reactor core 101 is critical—a single neutron from each fission nucleus results in fission of another nucleus—the chain reaction must be controlled. By sustaining controlled nuclear fission, the nuclear reactor system 100 produces heat energy. In an example implementation, the nuclear reactor system 100 is implemented as a gas-cooled high temperature nuclear reactor 107. However, the nuclear reactor system 100 with the control drum controller 215 can improve safety of the nuclear reactor 107 and reduce monitoring and maintenance by human operators in a large utility scale nuclear reactor, heat pipe nuclear reactor, molten-salt-cooled nuclear reactor, fuel-in-salt nuclear reactor, or a sodium-cooled fast nuclear reactor. For example, control drum controller 215 can be included in a nuclear reactor system 100, such as a gas-cooled graphite-moderated nuclear reactor, a fluoride salt-cooled high-temperature nuclear reactor with a higher thermal neutron flux than the gas-cooled graphite-moderated nuclear reactor, or a sodium fast nuclear reactor with a faster neutron flux than the gas-cooled graphite-moderated nuclear reactor.

In the depicted example, the nuclear reactor system 100 with the nuclear reactor core 101 is utilized in a space environment, such as in a nuclear thermal propulsion (NTP) system. A first example NTP system that the control drum controller 215 can be implemented in is described in FIGS. 1-2 and the associated text of U.S. Pat. No. 10,643,754 to Ultra Safe Nuclear Corporation of Seattle, Washington, issued May 5, 2020, titled "Passive Reactivity Control of Nuclear Thermal Propulsion Reactors" the entirety of which is incorporated by reference herein. A second example NTP system that the control drum controller 215 can be implemented in is described in International Application No. PCT/US2021/046274 to Ultra Safe Nuclear Corporation of Seattle, Washington, filed Aug. 17, 2021, titled "Combined Ammonia-Based Moderator and Propellant for Nuclear Thermal Propulsion Stages," the entirety of which is incorporated by reference herein. For example, the nuclear reactor system 100 that includes the control drum controller 215 can be a nuclear thermal rocket reactor, nuclear electric propulsion reactor, Martian surface reactor, or lunar surface reactor.

In such an NTP system (e.g., compact space nuclear reactor), a generated thrust propels a vehicle that houses, is formed integrally with, connects, or attaches to the nuclear reactor core 101, such as a rocket, drone, unmanned air vehicle (UAV), aircraft, spacecraft, missile, etc. Typically, this is done by heating a propellant, typically low molecular weight hydrogen, to over 2,600° Kelvin by harnessing thermal energy from the nuclear reactor core 101. In addition, the NTP nuclear reactor system 100 can be used in the propulsion of submarines or ships. As noted above, the nuclear reactor system 100 can also be a nuclear power plant in a terrestrial land application, e.g., for providing nuclear power (e.g., thermal and/or electrical power) for remote region applications including outer space, celestial bodies, planetary bodies, and remotes regions on Earth. For example, the nuclear reactor system 100 with the control drum controller 215 is utilized in a space reactor for electrical power production on a planetary surface. The nuclear reactor system 100 with the control drum controller 215 can be a small commercial fission power system for near term space operations, lunar landers, or a commercial fission power system for high-power spacecraft and large-scale surface operations, such as in-situ resource utilization.

Nuclear reactor system 100 can also be a terrestrial power system, such as a nuclear electric propulsion (NEP) system for fission surface power (FSP) system. NEP powers electric thrusters such as a Hall-effect thruster for robotic and human spacecraft. FSP provides power for planetary bodies such as the moon and Mars. In the NEP and FSP power applications, the nuclear reactor system 100 heats a working fluid (e.g., He, HeXe, Ne, $CO_2$) through a power conversion system (e.g., Brayton) to produce electricity. Moreover, in the NEP and FSP power applications, the nuclear reactor system 100 does not include a propellant, but rather includes a working fluid that passes through a reactor inlet when producing power. In the NEP and FSP power applications, the moderator elements 103A-N can be cooled via the reactor inlet working fluid (e.g., the flow coming out of a recuperator) before the working fluid passes through the fuel elements 104A-N.

Each of the fuel elements 104A-N, shown as nuclear fuel tiles 104A-N, includes a nuclear fuel. The nuclear fuel includes a fuel compact comprised of coated fuel particles, such as tristructural-isotropic (TRISO) fuel particles embedded inside a high-temperature matrix. In some implementations, the nuclear fuel includes a fuel compact comprised of bistructural-isotropic (BISO) fuel particles embedded inside the high-temperature matrix. In yet another implementation, the nuclear fuel includes a fuel compact comprised of a variation of TRISO known as TRIZO fuel particles. A TRIZO fuel particle replaces the silicon carbide layers of the TRISO fuel particle with zirconium carbide (ZrC). Alternatively, the TRIZO fuel particle includes the typical coatings of a TRISO fuel particle and an additional thin ZrC layer coating around the fuel kernel, which is then surrounded by the typical coatings of the TRISO fuel particle. The high-temperature matrix includes silicon carbide, zirconium carbide, titanium carbide, niobium carbide, tungsten, molybdenum, or a combination thereof. Each of the TRISO fuel particles can include a fuel kernel surrounded by a porous carbon buffer layer, an inner pyrolytic carbon layer, a binary carbide layer (e.g., ceramic layer of SiC or a refractory metal carbide layer), and an outer pyrolytic carbon layer. The refractory metal carbide layer of the TRISO fuel particles can include at least one of titanium carbide (TiC), zirconium carbide (ZrC), niobium carbide (NbC), tantalum carbide, hafnium carbide, ZrC—$ZrB_2$ composite, ZrC—$ZrB_2$—SiC composite, or a combination thereof. The high-temperature matrix can be formed of the same material as the binary carbide layer of the TRISO fuel particles.

A description of TRISO fuel particles dispersed in a silicon carbide matrix to form a cylindrical shaped nuclear fuel compact is provided in the following patents and publications of Ultra Safe Nuclear Corporation of Seattle, Washington: U.S. Pat. No. 9,299,464, issued Mar. 29, 2016, titled "Fully Ceramic Nuclear fuel and Related Methods"; U.S. Pat. No. 10,032,528, issued Jul. 24, 2018, titled "Fully Ceramic Micro-encapsulated (FCM) fuel for CANDUs and Other Reactors"; U.S. Pat. No. 10,109,378, issued Oct. 23, 2018, titled "Method for Fabrication of Fully Ceramic Microencapsulation Nuclear Fuel"; U.S. Pat. No. 9,620,248, issued Apr. 11, 2017 and U.S. Pat. No. 10,475,543, issued Nov. 12, 2019, titled "Dispersion Ceramic Micro-encapsulated (DCM) Nuclear Fuel and Related Methods"; U.S. Patent Pub. No. 2020/0027587, published Jan. 23, 2020, titled "Composite Moderator for Nuclear Reactor Systems"; and U.S. Pat. No. 10,573,416, issued Feb. 25, 2020, titled "Nuclear Fuel Particle Having a Pressure Vessel Comprising Layers of Pyrolytic Graphite and Silicon Carbide," the entireties of which are incorporated by reference herein. As described in those Ultra Safe Nuclear Corporation patents, the nuclear fuel can include a cylindrical fuel compact or pellet comprised of TRISO fuel particles embedded inside a silicon carbide matrix to create a cylindrical shaped nuclear fuel compact. A description of TRISO, BISO, or TRIZO fuel particles dispersed in a zirconium carbide matrix to form a cylindrical shaped nuclear fuel compact is provided in U.S. Patent Pub. No. 2021/0005335 to Ultra Safe Nuclear Corporation of Seattle, Washington, published Jan. 7, 2021, titled "Processing Ultra High Temperature Zirconium Carbide Microencapsulated Nuclear Fuel," the entirety of which is incorporated by reference herein.

As shown, nuclear reactor core 101 includes an insulator element array 112 of insulator elements 102A-N and a moderator element array 113 of moderator elements 103A-N. Insulator elements 102A-N are formed of a high-temperature thermal insulator material with low thermal conductivity. The high-temperature thermal insulator material can include low density carbides, metal-carbides, metal-oxides, or a combination thereof. More specifically, the high-temperature thermal insulator material includes low density SiC, stabilized zirconium oxide, aluminum oxide, low density ZrC, low density carbon, or a combination thereof. Moderator elements 103A-N are formed of a low-temperature solid-phase moderator. The low-temperature solid-phase moderator includes $MgH_x$, $YH_x$, $ZrH_x$, $CaH_x$, $ZrO_x$, $CaO_x$, $BeO_x$, $BeC_x$, Be, enriched boron carbide, $^{11}B_4C$, $CeH_x$, $LiH_x$, or a combination thereof.

In an NTP, NEP, or FSP nuclear reactor system 100, the nuclear reactor 107 can include a plurality of control drums 115A-N and a reflector 140. The control drums 115A-N may laterally surround the insulator element array 112 of insulator elements 102A-N, the moderator element array 113 of moderator elements 103A-N, and nuclear fuel tile array 114 of nuclear fuel tiles 104A-N to change reactivity of the nuclear reactor core 101 by rotating the control drums 115A-N. As depicted, the control drums 115A-N reside on the perimeter or periphery of a pressure vessel 160 and are positioned circumferentially around the insulator elements 102A-N, moderator elements 103A-N, and nuclear fuel tiles 104A-N of the nuclear reactor core 101. Control drums 115A-N may be located in an area of the reflector 140, e.g., an outer reflector region formed of reflector blocks 141A-N immediately surrounding the nuclear reactor core 101, to selectively regulate the neutron population and reactor power level during operation. For example, the control drums 115A-N can be a cylindrical shape and formed of both a reflector material 116 (e.g., beryllium (Be), beryllium oxide (BeO), BeSiC, BeMgO, $Al_2O_3$, etc.) on a first portion 166 of an outer surface 165 and an absorber material 117 on a second portion 167 of the outer surface 165 (e.g., outer circumference).

The reflector material 116 and the absorber material 117 can be on opposing sides of the cylindrical shape, e.g., portions of an outer circumference, of the control drums 115A-N. The reflector material 116 can include a reflector substrate 156 shaped as a cylinder or a truncated portion thereof. The absorber material 117 can include an absorber plate 157 or an absorber coating 158. The absorber plate 157 or the absorber coating 158 are disposed on the reflector substrate 156 to form the cylindrical shape of each of the control drums 115A-N. For example, the absorber plate 157 or the absorber coating 158 covers the reflector substrate 156 formed of the reflector material 116 to form the control drums 115A-N. When the reflector material 116 is the truncated portion of the cylinder, the absorber material 117 is a complimentary body shape to the truncated portion to form the cylindrical shape.

Control drums 115A-N can be formed of a continuous surface, e.g., rounded, aspherical, or spherical surfaces to form a cylinder or other conical surfaces to form a quadric surface, such as a hyperboloid, cone, ellipsoid, paraboloid, etc. Alternatively or additionally, the control drums 115A-N can be formed of a plurality of discontinuous surfaces (e.g., to form a cuboid or other polyhedron, such as a hexagonal prism). As used herein, "discontinuous" means that the surfaces in aggregate do not form a continuous outer surface 165 that is round (e.g., circular or oval) perimeter of the control drums 115A-N. In FIGS. 1A-B, the outer surface 165 shown is a rounded continuous surface.

Rotating the depicted cylindrical-shaped control drums 115A-N changes proximity of the absorber material 117 (e.g., boron carbide, $B_4C$) of the control drums 115A-N to the nuclear reactor core 101 to alter the amount of neutron reflection. When the reflector material 116 is inwards facing towards the nuclear reactor core 101 and the absorber material 117 is outwards facing, neutrons are scattered back (reflected) into the nuclear reactor core 101 to cause more fissions and increase reactivity of the nuclear reactor core 101. When the absorber material 117 is inwards facing towards the nuclear reactor core 101 and the reflector material 116 is outwards facing, neutrons are absorbed and further fissions are stopped to decrease reactivity of the nuclear reactor core 101.

Neutron reflector 140, e.g., shown as the outer reflector region, can be filler elements disposed between outermost nuclear fuel tiles 104A-N and the control drums 115A-N as well as around the control drums 115A-N. Reflector 140 can be formed of a moderator that is disposed between the outermost nuclear fuel tiles 104A-N and an optional barrel (e.g., formed of beryllium). The reflector 140 can include hexagonal or partially hexagonal shaped filler elements and can be formed of a neutron moderator (e.g., beryllium oxide, BeO). Although not required, nuclear reactor 107 can include the optional barrel (not shown) to surround the bundled collection that includes the insulator element array 112, moderator element array 113, nuclear fuel tile array 114 of the nuclear reactor core 101, as well as the reflector 140. As depicted, the control drums 115A-N reside on the perimeter of the pressure vessel 160 and can be interspersed or disposed within the reflector 140, e.g., surround a subset of the filler elements (e.g., reflector blocks 141A-N) forming the reflector 140.

Pressure vessel 160 can be formed of aluminum alloy, carbon-composite, titanium alloy, a radiation resilient SiC composite, nickel based alloys (e.g., Inconel™ or Haynes™) or a combination thereof. Pressure vessel 160 and nuclear reactor system 100 can be comprised of other components, including cylinders, piping, and storage tanks that transfer a moderator coolant that flows through moderator coolant passages 121A-N; and a separate nuclear fuel coolant, such as a propellant (e.g., hydrogen gas or liquid) that flows through the fuel coolant passages 141A-N. The moderator coolant and the nuclear fuel coolant can be a gas or a liquid, e.g., that transitions from a liquid to a gas state during a burn cycle of the nuclear reactor core 101 for thrust generation in an NTP nuclear reactor system 100. Hydrogen is for an NTP nuclear reactor system 100. In NEP or FSP applications, the nuclear reactor system 100 circulates a working fluid, such as He, neon, HeXe, $CO_2$, instead.

In the example of FIG. 2B, nuclear reactor system 100 enables the moderator coolant to flow through the moderator coolant passages 121A-N and a separate nuclear fuel coolant (e.g., a propellant, such as hydrogen gas) to flow through the fuel coolant passages 141A-N. The moderator coolant passages 121A-N are flattened ring shaped (e.g., O-shape) openings, such as a channels or holes to allow the moderator coolant to pass through in the nuclear reactor core 101 and into a heat sink (not shown) via a dedicated moderator coolant loop, for example. The fuel coolant passages 141A-N are channels or holes to allow the nuclear fuel coolant to pass through in the nuclear reactor core 101 and into a thrust chamber (not shown) for propulsion in a separate nuclear fuel coolant loop, for example.

In an alternative implementation, a coolant that is shared between the moderator elements 103A-N and the nuclear fuel tiles 104A-N may be flowed through both the moderator coolant passages 121A-N and the fuel coolant passages 141A-N. In the alternative implementation, the coolant that flows through the plurality of fuel elements 104A-N can include helium, FLiBe molten salt formed of lithium fluoride (LiF), beryllium fluoride ($BeF_2$), sodium, He, HeXe, $CO_2$, neon, or HeN. The shared coolant flows through the moderator coolant passages 121A-N before the shared coolant is heated in the nuclear fuel tiles 104A-N. This keeps the moderator elements 103A-N cool.

Returning to the control drum controller 215 of the nuclear reactor system 100, the control drum controller 215 includes a plurality of counterweights 225A-N. A respective counterweight 225A-N is coupled a respective control drum 115A-N of the plurality of control drums 115A-N. The respective counterweight 225A-N is external or internal to the respective control drum 115A-N to impart a respective bias on the respective control drum 115A-N. Although the counterweights 225A-N can be external or internal to the control drums 115A-N.

Counterweights 225A-N impart a bias on the control drums 115A-N. The bias includes a force that the counterweights 225A-N exert to move the control drums 115A-N to a decreasing neutron flux position when not counteracted by an opposing force of the electrical drive mechanism 219A-N, which occurs during a loss or interruption of electrical power 153A-B from the power source 154A-B. The bias attempts, but does not actually move the control drums 115A-N from the increasing neutron flux position to the decreasing neutron flux position when counteracted by the opposing force of the electrical drive mechanism 219A-N, which occurs during availability of electrical power 153A from the power source 154A.

Nuclear reactor system 100 further includes a plurality of electrical drive mechanisms 219A-N. The control drum controller 215 further includes a plurality of actuators 120A-N and tension members 217A-N. A respective actuator 120A-N is coupled to the respective control drum 115A-N via a respective tension member 217A-N and respective driving pulleys 236A-N and driven pulleys 216A-N. A respective electrical drive mechanism 219A-N is coupled the respective control drum 115A-N via the respective actuator 120A-N and the respective tension member 217A-N.

The control drum controller 215 of FIGS. 2A-B includes pulleys 216A, 226A, 236A and a tension member 217A for torque transfer from an actuator 120A to one or more control drums 115A coupled with a pre-tension spring, torsion spring 619B (see FIG. 6), or counterweight 225A. First, the control drum controller 215 includes a driven pulley 216A for transmitting tension in the tension member 217A, which is a wire rope 218, to torque in the control drum 115A. Second, the control drum controller 215 includes a pre-tension spring as a functional counterweight 225A to apply both a safety function on loss of power and to allow bi-directional control of the control drum 115A. Third, the control drum controller 215 includes a wire rope 218 or other tension member (such as the rod 618 of FIG. 6) to connect the driven pulley 216A to the actuator 120A. The existing approach shown in FIGS. 1A-C is to use a co-axial shaft driven by an actuator 120Z mounted above the pressure vessel 160, in line with the control drum 115Z. The improved control drum controller 215 uses a driven pulley 216A as a pulley disk to transmit torque, converting the torque into tension in a tension member 217A.

As outlined below, the control drum controller 215 of FIGS. 2A-B can includes the following additional components. First, the control drum controller 215 includes an idler pulley 226A to redirect the wire rope 218 to a side-wall penetration of the pressure vessel 160 side 862 (see FIG. 8). Second, the control drum controller 215 includes an electrical drive mechanism 219A (e.g., stepper motor) that is connected to a driving pulley 236A. Third, the control drum controller 215 includes a torsion spring 619A (see FIG. 6) on the driving pulley 236A to ensure the wire-line tension of the wire rope 218 is maintained during snap-back events. Fourth, the control drum controller 215 includes a support bracket 280A to fix the torsion spring 619A to a non-rotating reference frame. Fifth, the control drum controller 215 includes roller contact bearings, along the wire rope 218 and within the vessel nozzle 250A, to support the side loads applied by the wire rope 218. The roller contact bearings are standard components. Sixth, as shown in FIG. 3 and particularly FIG. 7, the control drum controller 215 includes grouping multiple control drums 115P-X to a single actuator shaft 221B within an actuator 120P by redirecting the wire ropes 218P-X acting as tension members 217P-X.

Therefore, FIGS. 2A-B depict a nuclear reactor system 100 including a pressure vessel 160 and a nuclear reactor core 101 disposed in the pressure vessel 160. The nuclear reactor core 101 includes a plurality of fuel elements 104A-N and at least one moderator element 103A-N. The nuclear reactor system 100 further includes a plurality of control drums 115A-N disposed longitudinally within the pressure vessel 160 and laterally surrounding the plurality of fuel elements 104A-N and the at least one moderator element 103A-N to control reactivity of the nuclear reactor core 101. Each of the control drums 115A-N includes a reflector material 116 on a first portion 166 of an outer surface 165 and an absorber material 117 on a second portion 167 of the outer surface 165.

The nuclear reactor system 100 further includes a control drum controller 215, which includes a counterweight 225A that is external or internal to a control drum 115A of the plurality of control drums 115A-N to impart a reverse torque on the control drum 115A. The control drum controller 215 further includes a driven pulley 216A coupled to the counterweight 225A and to rotatably control the control drum 115A based on a torque. The control drum controller 215 further includes a tension member 217A coupled to the driven pulley 216A to rotatably control the driven pulley 216A and apply the torque to the driven pulley 216A. The control drum controller 215 further includes an actuator powered by power 153A from a power source 154A and coupled to the tension member 217A to apply a tension force to the tension member 217A by winding or unwinding the tension member 217A.

The actuator 120A counteracts the reverse torque of the counterweight 225A with the applied tension force. The tension member 217A applies the torque to the driven pulley 216A in response to the applied tension force. Based on the applied torque, the driven pulley 216A rotatably controls the control drum 115A.

The actuator 120A may directly convert power 153A into torque, or may indirectly convert power 153A into torque via an electrical drive mechanism 219A, depending on the construction of the actuator 120A. The actuator 120A may integrate an electrical drive mechanism 219A within the actuator 120A itself.

In some examples, the driven pulley 216A rotatably controls the control drum 115A during availability of the power 153A from the power source 154A. The driven pulley 216A rotatably controls the reflector material 116 and the absorber material 117 to selectively face inwards towards the nuclear reactor core 101 or outwards away from the nuclear reactor core 101. The power 153A includes a mechanical power, an electrical power, or a combination thereof, and during availability of the mechanical power or the electrical power from the power source 154A, the driven pulley 216A applies the torque to the control drum 115A in response to the torque to rotatably control the control drum 115A. During a mechanical failure of the control drum controller 215 such that the mechanical power is no longer available to the actuator 120A, the counterweight 225A aligns the absorber material 117 of the control drum 115A to face inwards towards the nuclear reactor core 101.

In this example, the nuclear reactor system 100 further comprises an electrical drive mechanism 219A. The electrical drive mechanism 219A is: (a) powered by the electrical power 153A from the power source 154A, (b) coupled to rotatably control the control drum 115A, and (c) further coupled to the actuator 120A. During a loss or interruption of the electrical power 153A from the power source 154A such that the electrical power 153A is no longer available to the electrical drive mechanism 219A, the counterweight 225A aligns the absorber material 117 of the control drum 115A to face inwards towards the nuclear reactor core 101. Additionally, in some examples the nuclear reactor system 100 further includes a plurality of electrical drive mechanisms 219A-N. The control drum controller 215 includes a plurality of actuators 120A-N. A respective actuator 120A-N is coupled to a respective control drum 115A-N. A respective electrical drive mechanism 219A-N is coupled to the respective control drum 115A-N and the respective actuator 120A-N.

Furthermore in some examples the control drum controller 215 includes a plurality of counterweights 225A-N. A respective counterweight 225A-N is coupled to a respective control drum 115A-N of the plurality of control drums 115A-N. The control drum controller 215 can also include a plurality of tension members 217A-N. A respective tension member 217A-N is coupled to a respective control drum 115A-N of the plurality of control drums 115A-N.

In this example, the tension member 217A is a wire rope 218. The actuator 120A includes an actuator shaft 221A. The actuator 120A applies the tension force to the wire rope 218 by rotating the actuator shaft 221A and winding the wire rope 218 around the actuator shaft 221A. The wire rope 218 includes a proximal end 228 disposed within the pressure vessel 160, and the wire rope 218 includes a distal end 238 disposed outside the pressure vessel 160. The control drum controller includes an idler pulley 226A, and the wire rope 218 is further coupled to the idler pulley 226A. The control drum controller 215 further includes a control drum shaft 231, and the driven pulley 216A is coupled to the control drum 115A via the control drum shaft 231. The control drum shaft 231 is a different shaft than the actuator shaft 221A. The control drum shaft 231 and the actuator shaft 221A are substantially parallel to each other. However, due to the nature of a wire rope 218 type of tension member 217A, the control drum shaft 231 and the actuator shaft 221A can have any orientation relative to each other. The actuator 120A is disposed outside the pressure vessel 160, which again allows for more efficient use of the space within the pressure vessel 160, avoiding the problems in the prior art shown in FIG. 1A. The actuator 120A is located substantially lateral to the control drum 115A, though this is an example design—by using a wire rope 218 as a tension member 217A, there is no limit on the length of the wire rope 218 beyond the stability of the wire rope 218 itself. Therefore the actuator 120A can be located anywhere accessible by the wire rope distal end 238 while the wire rope proximal end 228 is properly coupled to the driven pulley 216A.

Furthermore, while the control drum controller 215 includes a rotary system that includes actuator 120A, and other components to withdraw the tension member 217A (e.g., wire rope 218). The control drum controller 215 can also linearly pull the tension member 217A (e.g., wire rope 218), rather than winding and unwinding the wire rope 218. The control drum controller 215 can also linearly pull the tension member 217O, e.g., the rod 618 type of tension member 217O disclosed in FIG. 6.

The counterweight 225A includes a spring that is external to the control drum 115A. The reverse torque includes an elastic force of the spring. During the loss or interruption of the power 153A, the control drum 115A is responsive to the elastic force of the spring to rotatably control the control drum 115A to align the absorber material 117 to face inwards toward the nuclear reactor core 101. Each of the control drums 115A-N is a cylindrical shape, and the outer surface 165 is an outer circumference of the cylindrical shape. The reflector material 116 includes a reflector substrate 156 shaped as a cylinder or a truncated portion thereof. The absorber material 117 includes an absorber plate 157 or absorber coating 158; the absorber plate 157 or absorber coating are disposed on the reflector substrate 156 to form the cylindrical shape of each of the control drums 115A-N. During availability of the power 153A from the power source 154A, the actuator 120A aligns an entirety or section of the absorber material 117 of the control drum 115A to face outwards away from the nuclear reactor core 101 to selectively control reactivity of the nuclear reactor core 101. During availability of the power 153A from the power source 154A, the actuator 120A maintains the control drum 115A at a permanently fixed longitudinal position.

Figure 4:
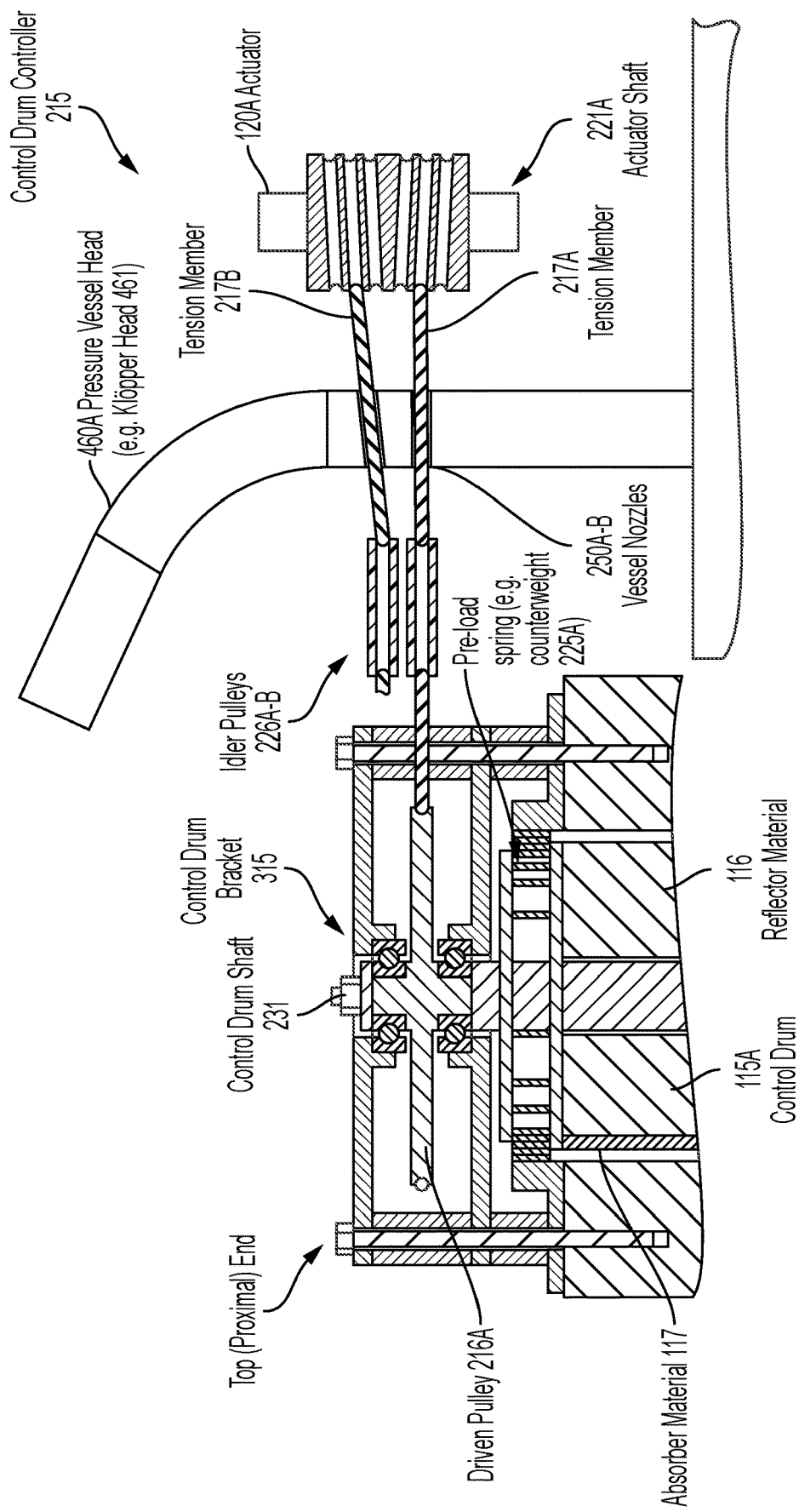
FIG. 4 is the cross-sectional view of the control drum of FIGS. 2A-B and 3, depicted with a Klöpper head type of pressure vessel head being penetrated by the tension member of the control drum controller of the nuclear reactor system.

FIG. 3 is a cross-sectional view of a control drum 115A, and a side view of an actuator 120A and idler pulleys 226A-B of the control drum controller 215 of the nuclear reactor system 100 of FIGS. 2A-B. As shown, FIG. 3 depicts the control drum controller 215 from FIG. 2A, except this depiction of the control drum controller 215 includes a second tension member 217B coupled to a second idler pulley 226B, running to a second control drum 115B (not shown). FIG. 3 shows how a single actuator 120A and actuator shaft 221A can ultimately control multiple control drums 115A-B, by using multiple tension members 217A-B and diverting the tension members 217A-B throughout the pressure vessel 160 via idler pulleys 226A-B. Additionally, although the driven pulley 216A and the control drum bracket 315 that secures the driven pulley 216A to the control drum 115A via the control drum shaft 231 is shown at the top (proximal) end of the control drum 115A, the driven pulley 216A can be placed at the bottom end or within the middle of the control drum 115A. FIG. 4 is the cross-sectional view of the control drum 115A of FIGS. 2A-B and 3, depicted with a Klöpper head 461 type of pressure vessel head 460A being penetrated by the tension members 217A-B of the control drum controller 215 of the nuclear reactor system 100. As shown, FIG. 4 depicts the control drum controller 215 from FIG. 3, but also depicts the pressure vessel head 460A of the pressure vessel 160. This pressure vessel head 460A is in the style of a Klöpper head 461, but comparing this implementation of the Klöpper head 461 with the control drum controller 215 in FIG. 4 to the prior art Klöpper head 461 implementation in FIG. 1A, illustrates numerous advantages achieved by the nuclear reactor system 100 of FIG. 4. In particular, by using wire rope 218, the depicted vessel nozzles 250A-B can be as narrow as the rope wire 218 itself. The vessel nozzle 250Z (see FIGS. 1B-C) in the prior art is much larger, and would need to be able to accommodate the entire diameter of the control drum shaft 231 rather than the narrow rope wire 218. Additionally, the actuator 120Z in the prior art must be mounted on the Klöpper head 461, whereas in this example the actuator 120A can be mounted anywhere accessible to wire rope 218, which is re-directable via idler pulleys 226A-B. Therefore, FIG. 4 depicts a nuclear reactor system 100 where the pressure vessel 160 further includes a pressure vessel head 460A, and the pressure vessel head 460A includes a Klöpper head 461.

Figure 5:
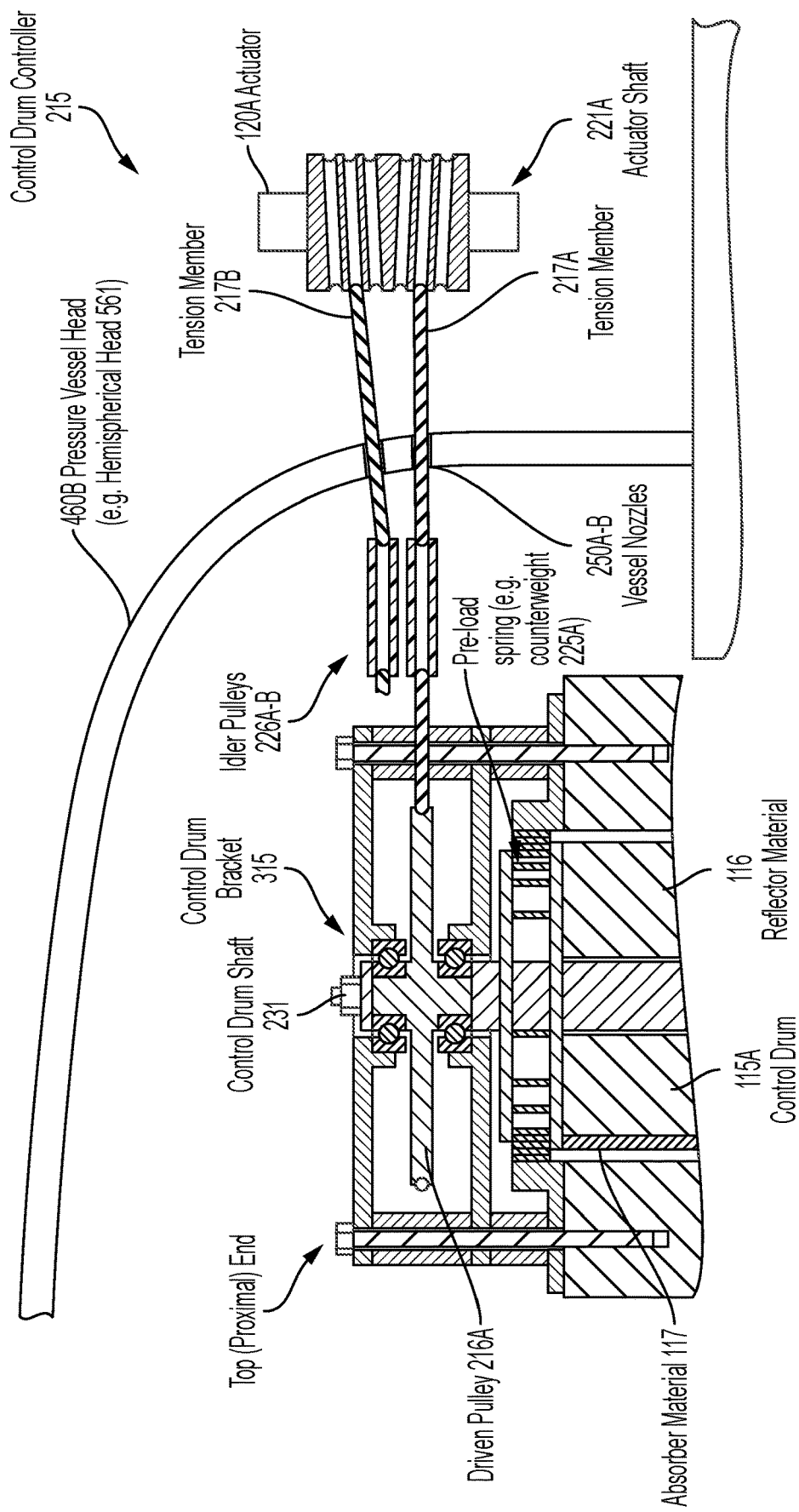
FIG. 5 is the cross-sectional view of the control drum of FIGS. 2A-B and 3, depicted with a hemispherical head type of pressure vessel head being penetrated by the tension member of the control drum controller of the nuclear reactor system.

FIG. 5 is the cross-sectional view of the control drum 115A of FIGS. 2A-B and 3, depicted with a hemispherical head 561 type of pressure vessel head 460B being penetrated by the tension members 217A-B of the control drum controller 215 of the nuclear reactor system 100. The control drum controller 215 of FIG. 5 is very similar to FIG. 4, but FIG. 5 depicts a hemispherical head 561 instead of a Klöpper head 461. Comparing this hemispherical head 561 with the control drum controller 215 in FIG. 5 with the prior art hemispherical head 561 in FIG. 1B, illustrates numerous advantages achieved by the nuclear reactor system 100 of FIG. 5. Primarily, here the actuator 120A is outside of the pressure vessel 160. The external actuator 120A is easier to maintain, and can be operated from any distance accessible by the tension members 217A-B. Additionally, placing the actuator 120A outside of the pressure vessel head 460B allows for the top of the pressure vessel head 460B to be closer to the top of the control drum 115A and the fuel elements 104A-N. This closer placement improves the volume efficiency of the pressure vessel 160, as more components are directly related to reactivity (moderator elements 103A-N, fuel elements 104A-N, and control drums 115A-N) rather than control components, or void space that fuel elements 104A-N and control drums 115A-N cannot make use of. Therefore, FIG. 5 depicts a nuclear reactor system 100 where the pressure vessel 160 further includes a pressure vessel head 460B, and the pressure vessel head 460B includes a hemispherical head 561.

Figure 6:
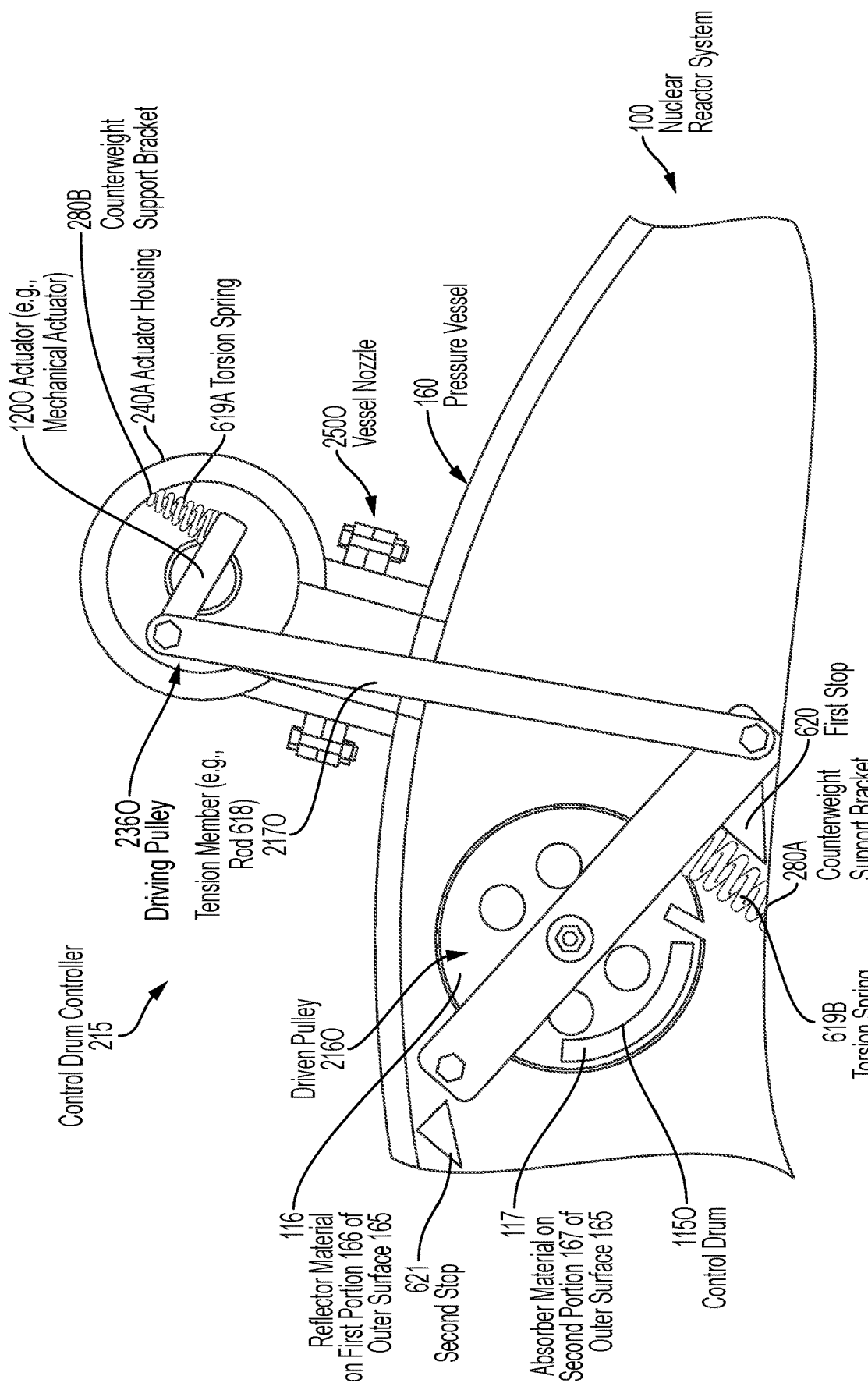
FIG. 6 illustrates a first variation of the control drum controller of the nuclear reactor system of FIGS. 2A-B, in which an actuator of the control drum controller includes a rod as a tension member and a first stop and a second stop.

FIG. 6 illustrates a first variation of the control drum controller 215 of the nuclear reactor system 100 of FIGS. 2A-B, in which an actuator 120O of the control drum controller 215 includes a rod 618 as a tension member 217O and a first stop 620 and a second stop 621. This control drum controller 215 is similar to the control drum controller 215 of FIG. 2A, except the driven pulley 216O is linked to a driving pulley 236O via a rod 618 rather than a wire rope 218. Utilizing a rod 618 allows the driving pulley 236O to both push and pull the driven pulley 216A, and the torsion spring 619B acting as a counterweight like the counterweight 225A of FIG. 2A can potentially be removed, or placed within the actuator housing 240A as torsion spring 619A. When utilized, the torsion springs 619A-B are fixed to a non-rotating reference frame by a respective counterweight support bracket 280A-B.

The rod 618 is more rigid than the wire rope 218. Adding joints to the rod 618 (e.g., a chain with flat, thin metal sections) either requires a tight track for the rod 618 to reside in, or can result in the rod 618 behaving like the wire rope 218 and can result in the rod 618 not being able to push the driven pulley 216O. Additionally, a width of the vessel nozzle 250O is designed to accommodate the translation of the rod 618 as the rod 618 is moved by the driving pulley 236A. For example, the width of the vessel nozzle 250O is designed based upon: (1) the length of the rod 618; (2) the diameter of the driving pulley 236O; and/or (3) the diameter of driven pulley 216O. This can be somewhat alleviated by introducing a gearing mechanism, preferably at the driven pulley 216O, resulting in, for example, a less than one quarter turn of the driving pulley 236O inducing a more than one quarter turn of the driven pulley 216O.

Control drum controller 215 with control drum 115O can include a physical first stop 620 and a physical second stop 621 on the axis of rotation of control drum 115O. The first stop 620 and the second stop 621 can be built into the actuator 120A or within or near the driven pulley 216A to only allow the control drum 115O to rotate within a 180 degree angle, regardless of how much bias (e.g., force) the counterweight torsion spring 619A-B or the actuator 120O imparts (e.g., applies). The 180 degree angle is dependent upon a control drum design 115O with two faces: a control drum 115O with multiple faces, or faces of incongruent sizes, may require a maximum rotational angle greater than or less than 180 degrees. The first stop 620 and the second stop 621 form a mechanism to enable stops for the control drum 115O at both launch conditions and operating conditions; at launch the torsion spring 619B can drive the control drum 115O to minimum worth, during operation the torsional spring can drive the control drum 115O to hot critical.

Therefore, FIG. 6 depicts a control drum controller 215 where the tension member 217O includes a rod 618. The actuator 120O of the nuclear reactor system 100 also includes a torsion spring 619A. The control drum controller 215 further includes a first stop 620 and a second stop 621. The first stop 620 prevents the tension force from aligning the absorber material 117 of the control drum 115A to face inwards toward the nuclear reactor core 101. The second stop 621 prevents the counterweight 225A from aligning the absorber material 116 of the control drum 115A to face outwards away from the nuclear reactor core 101. The control drum controller 215 of FIG. 6 illustrates a rod 618, but any kind of thin, metal sections could be used as a tension member 217O, in addition to the braided or twisted wire rope 218 disclosed in FIG. 2A.

FIG. 7 is an illustration of a second variation of a nuclear reactor system 100 of FIGS. 2A-B with the plurality of control drums 115P-X rotatably controlled by a single actuator 120P, a single electrical drive mechanism 219P and a single mass-based counterweight 225P. This example is similar to FIG. 2B in that there are a plurality of fuel elements 104A-N (not shown) surrounded by the plurality of control drums 115P-X. Each control drum 115P-X is coupled to a tension member 217P-X. A single actuator shaft 221B is connected to multiple driving pulleys 236P-Z. That actuator shaft 221B of the actuator 120A is coupled to the counterweight 225P, which is external to the control drums 115P-X and heavy enough to rotate all of the control drums 115P-X in the nuclear reactor system 100. The electrical drive mechanism 219P is strong enough and receives electrical power 153B from the non-line power source 154B to rotate all of the control drums 115P-X via the actuator 120P, the driving pulley 236P, the driven pulleys 216P-X, and several idler pulleys 226C-F, as well as move the counterweight 225P to the apex position of the counterweight 225P. The idler pulleys 226C-F re-direct the wire rope 218 tension members 217P-X so that the tension members 217P-X can connect to the single actuator 120P. The tension members 217P-X are brought together in bundles to the driving pulleys 236P-X on the single actuator shaft 221B. The electrical drive mechanism 219P, actuator 120P, and counterweight 225P all interact with each other in the same manner as the electrical drive mechanism 219A, actuator 120A, and counterweight 225A in FIG. 2A. As in FIG. 2A, the counterweight 225P can be replaced with a counterweight 225P that includes a sufficiently large spring (see FIG. 2A). The actuator 120A rotates all of the control drums 115P-X equally, and the control drums 115P-X are configured such that when the counterweight 225P is at the apex position of the counterweight 225P, the absorber material 117 of each control drum 115P-X is facing away from the fuel elements 104A-N. When the counterweight 225P is at the nadir position of the counterweight 225P, the absorber material 117 of each control drum 115P-X is facing toward the fuel elements 104A-N.

The control drum controller 215 can include an intermediate number of actuators 220A-F and counterweights 2225A-F. For example, five actuators 120A-E and counterweights 225A-E for ten control drums 115A-J. The control drum controller 215 of FIG. 7 groups of multiple driving pulleys 236P-X (control pulleys) to a single actuator 120P by bringing the wire rope 218 type of tension members 217P-X together in bundles. For example, in FIGS. 3-5 two tension members 217A-B (e.g., wire ropes 218A-B) are bundled to a single actuator 120A; however, many more wire ropes 218A-N can be bundled.

Figure 8:
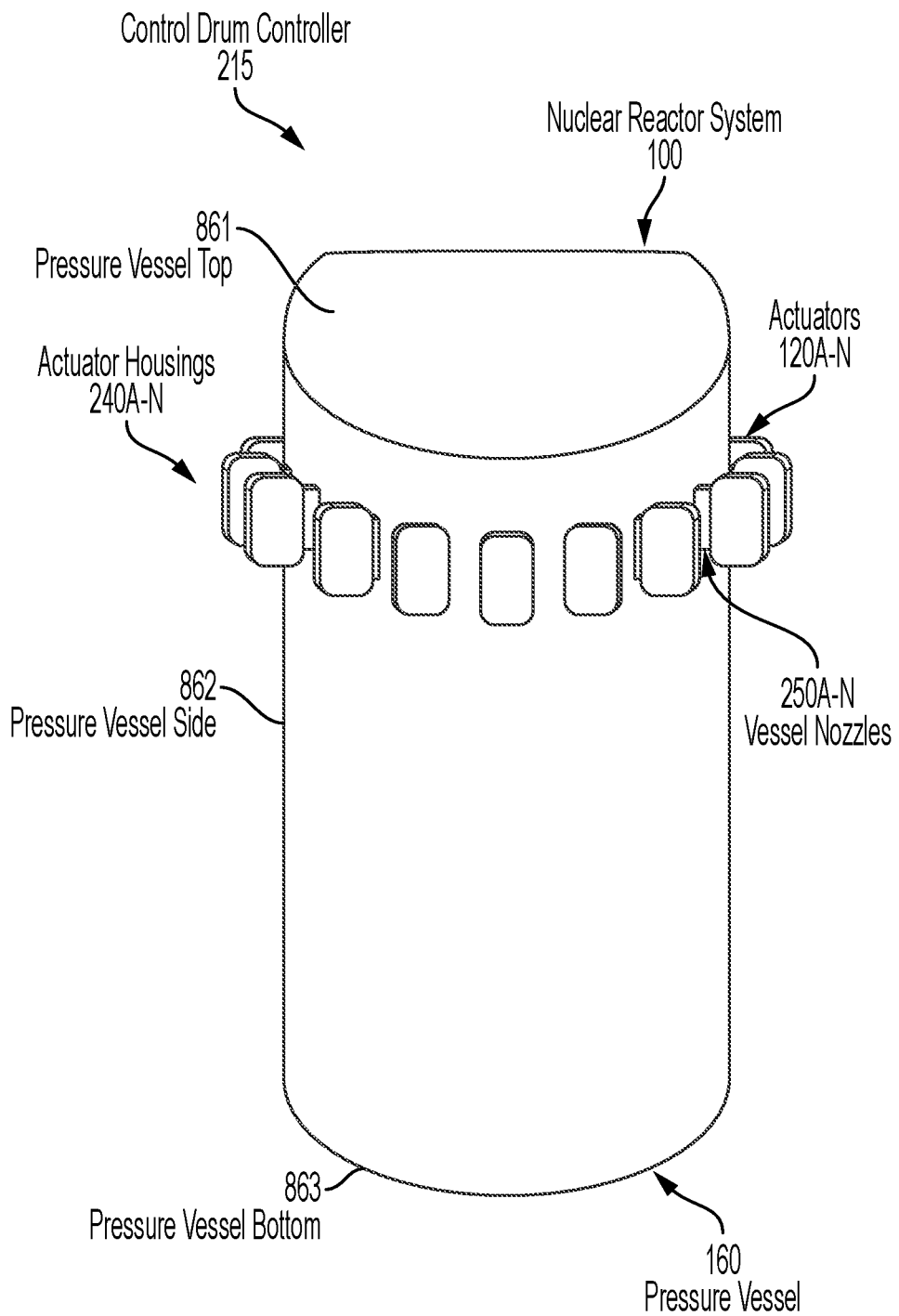
FIG. 8 illustrates the exterior of a pressure vessel with multiple actuators arranged around the pressure vessel side of the nuclear reactor system of FIGS. 2A-B.

FIG. 8 illustrates the exterior of a pressure vessel 160 with multiple actuators 120A-N arranged around the pressure vessel side 862 of the nuclear reactor system 100 of FIGS. 2A-B. The actuators 120A-N are not mounted on the pressure vessel top 861 or the pressure vessel bottom 863. Additionally, the vessel nozzles 250A-N can be seen to be much smaller in all three dimensions than the actuators 120A-N located in a respective actuator housing 240A-N. Smaller vessel nozzles 250A-N accommodate smaller openings, improving the stability of the entire pressure vessel 160.

Figure 9A:
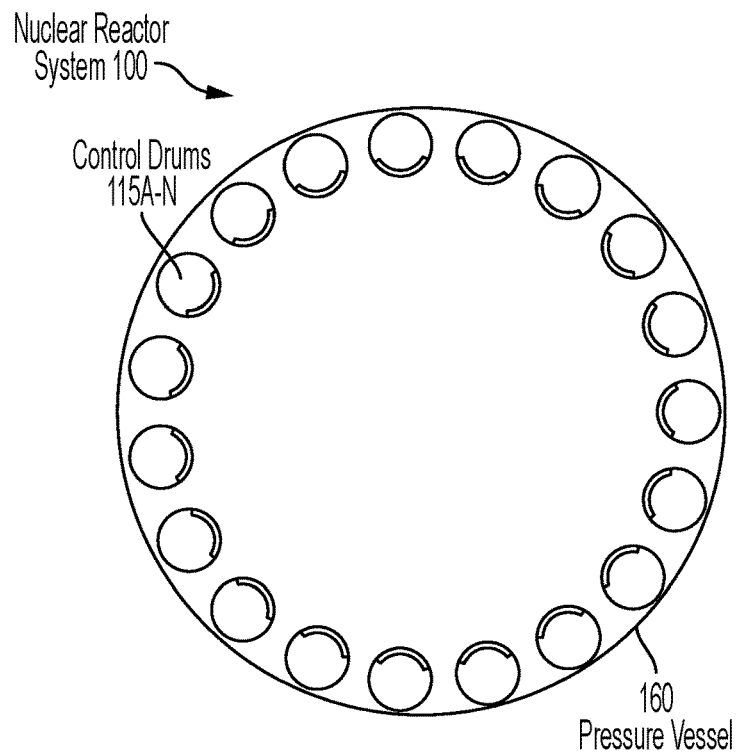
FIGS. 9A-B show the effect of rotating the control drums of FIGS. 2A-B simultaneously, by the control drum controller.
Figure 9B:
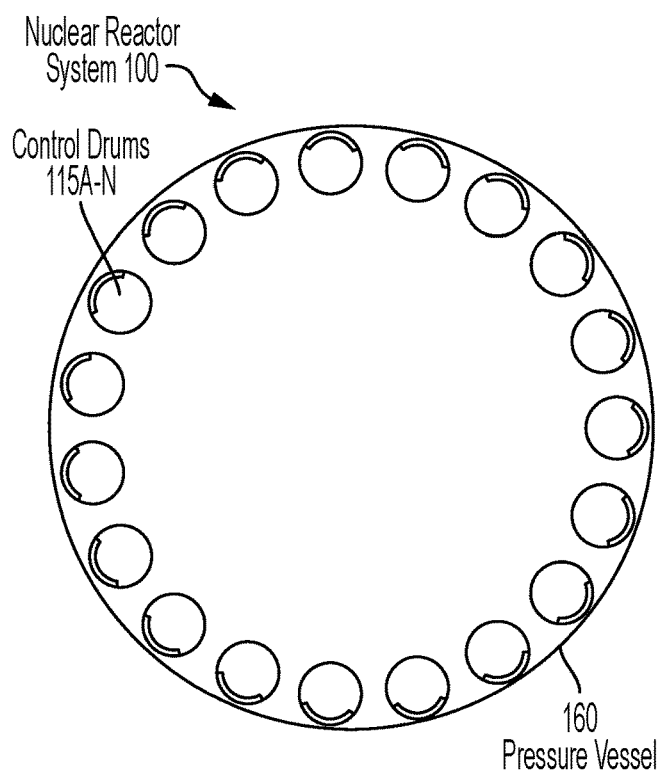

FIG. 9A-B shows the effect of rotating the control drums 115A-N of FIGS. 2A-B simultaneously, by the control drum controller 215. In the nuclear reactor system 100, the control drum controller 215 can include individual, non-shared actuators 120A-N and counterweights 225A-N for each of the control drums 115A-N to simultaneously rotate the control drums 115A-N during the loss or interruption of the electrical power 153A-B to the electrical device mechanism 219A-N. Alternatively, as described in FIG. 7, the control drum controller 215 can include a single actuator 120P and a single counterweight 225P to simultaneously rotate the control drums 115P-X during the loss or interruption of the electrical power 153B.

In FIG. 9A, all of the control drums 115A-N are in the "dropped position" of FIG. 2A. The absorber material 117 of the control drums 115A-N faces inwards towards the nuclear reactor core 101 at the center of the pressure vessel 160. In FIG. 9B, all of the control drums 115A-N are in the "extracted position" of FIG. 2B. The absorber material 117 of the control drums 115A-N faces outwards away from the nuclear reactor core 101 at the center of the pressure vessel 160.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," "has," "having," "containing," "contain", "contains," "with," "formed of," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A nuclear reactor system, comprising:
  a pressure vessel;
  a nuclear reactor core disposed in the pressure vessel, the nuclear reactor core including a plurality of fuel elements and at least one moderator element;
  a plurality of control drums disposed longitudinally within the pressure vessel and laterally surrounding the plurality of fuel elements and the at least one moderator element to control reactivity of the nuclear reactor core, wherein each of the control drums includes a reflector material on a first portion of an outer surface of a respective control drum and an absorber material on a second portion of the outer surface of the respective control drum; and
  a control drum controller including:
    a counterweight that is external to a control drum of the plurality of control drums to impart a reverse torque on the control drum,
    a driven pulley coupled to the counterweight and to rotatably control the control drum based on a torque applied to the driven pulley,
    a tension member coupled to the driven pulley to rotatably control the driven pulley and apply the torque to the driven pulley, and
    an actuator powered by power from a power source and coupled to the tension member to apply a tension force to the tension member by winding or unwinding the tension member;
  wherein:
    the actuator counteracts the reverse torque of the counterweight with the applied tension force,
    the tension member applies the torque to the driven pulley in response to the applied tension force, and
    based on the torque applied to the driven pulley, the driven pulley rotatably controls the control drum.

2. The nuclear reactor system of claim 1, wherein:
the driven pulley rotatably controls the control drum during availability of the power from the power source.

3. The nuclear reactor system of claim 2, wherein:
the driven pulley rotatably controls the control drum to selectively face the reflector material or the absorber material inwards towards the nuclear reactor core or outwards away from the nuclear reactor core.

4. The nuclear reactor system of claim 2, wherein:
the power includes a mechanical power, an electrical power, or a combination thereof; and
during availability of the power from the power source, in response to the torque applied to the driven pulley, the driven pulley rotatably controls the control drum.

5. The nuclear reactor system of claim 4, wherein:
during a mechanical failure of the control drum controller such that the power is no longer available to the actuator, the counterweight aligns the absorber material of the control drum to face inwards towards the nuclear reactor core.

6. The nuclear reactor system of claim 4, further comprising an electrical drive mechanism, wherein:
the power includes the electrical power;
the electrical drive mechanism is:
  (a) powered by the electrical power from the power source, and
  (b) coupled to the actuator to rotatably control the control drum;
and
during a loss or interruption of the electrical power from the power source such that the electrical power is no longer available to the electrical drive mechanism, the counterweight aligns the absorber material of the control drum to face inwards towards the nuclear reactor core.

7. The nuclear reactor system of claim 6, further comprising a plurality of electrical drive mechanisms, wherein:
the control drum controller further includes a plurality of actuators, wherein a respective actuator is coupled to the respective control drum; and a respective electrical drive mechanism is coupled to the respective control drum and the respective actuator.

8. The nuclear reactor system of claim 1, wherein the control drum controller further includes:
a plurality of counterweights, wherein a respective counterweight is coupled to the respective control drum of the plurality of control drums.

9. The nuclear reactor system of claim 1, wherein the control drum controller further includes:
a plurality of tension members, wherein a respective tension member is coupled to the respective control drum of the plurality of control drums.

10. The nuclear reactor system of claim 1, wherein:
the tension member includes a wire rope;
the actuator includes an actuator shaft; and
the actuator applies the tension force to the wire rope by rotating the actuator shaft and winding the wire rope around the actuator shaft.

11. The nuclear reactor system of claim 10, wherein:
the wire rope includes a first end disposed within the pressure vessel; and
the wire rope includes a second end disposed outside the pressure vessel.

12. The nuclear reactor system of claim 10, wherein:
the control drum controller further includes an idler pulley; and
the wire rope is further coupled to the idler pulley.

13. The nuclear reactor system of claim 10, wherein:
the control drum controller further includes a control drum shaft;
the driven pulley is coupled to the control drum via the control drum shaft; and
the control drum shaft is a different shaft than the actuator shaft.

14. The nuclear reactor system of claim 13, wherein:
the control drum shaft and the actuator shaft are substantially parallel to each other.

15. The nuclear reactor system of claim 1, wherein:
the actuator is disposed outside the pressure vessel.

16. The nuclear reactor system of claim 1, wherein:
the actuator is located substantially lateral to the control drum.

17. The nuclear reactor system of claim 1, wherein:
the tension member includes a rod.

18. The nuclear reactor system of claim 1, wherein:
the actuator includes a torsion spring.

19. The nuclear reactor system of claim 1, wherein:
the counterweight includes a spring that is external to the control drum;
the reverse torque includes an elastic force of the spring; and
during a loss or interruption of the power, the control drum is responsive to the elastic force of the spring to rotatably control the control drum to align the absorber material to face inwards towards the nuclear reactor core.

20. The nuclear reactor system of claim 1, wherein:
the pressure vessel further comprises a pressure vessel head; and
the pressure vessel head includes a hemispherical head.

21. The nuclear reactor system of claim 1, wherein:
the pressure vessel further comprises a pressure vessel head; and
the pressure vessel head includes a Klöpper head.

22. The nuclear reactor system of claim 1, wherein:
the control drum controller further includes:
a first stop, and
a second stop;
the first stop prevents the tension force from aligning the absorber material of the control drum to face inwards toward the nuclear reactor core; and
the second stop prevents the counterweight from aligning the absorber material of the control drum to face outwards away from the nuclear reactor core.

23. The nuclear reactor system of claim 1, wherein:
each of the control drums is a cylindrical shape.

24. The nuclear reactor system of claim 23, wherein:
the reflector material includes a reflector substrate;
the absorber material includes an absorber plate or an absorber coating; and
the absorber plate or the absorber coating are disposed on the reflector substrate to form the cylindrical shape of each of the control drums.

25. The nuclear reactor system of claim 1, wherein:
during availability of the power from the power source, the actuator aligns an entirety or section of the absorber material of the control drum to face outwards away from the nuclear reactor core to selectively control reactivity of the nuclear reactor core.

26. The nuclear reactor system of claim 25, wherein:
during availability of the power from the power source, the actuator maintains the control drum at a permanently fixed longitudinal position.

* * * * *